(12) United States Patent (10) Patent No.: US 8,746,462 B2
Mbadinga-Mouanda et al. (45) Date of Patent: Jun. 10, 2014

(54) FILTER FOR FILTERING FLUIDS

(75) Inventors: Gelase Mbadinga-Mouanda, Karlsruhe (DE); Klaus Gehwolf, Mamming (DE)

(73) Assignee: Mann + Hammel GmbH, Ludwigsburg (DE)

( * ) Notice: Subject to any disclaimer, the term of this patent is extended or adjusted under 35 U.S.C. 154(b) by 0 days.

(21) Appl. No.: 13/413,801

(22) Filed: Mar. 7, 2012

(65) Prior Publication Data

US 2013/0062277 A1 Mar. 14, 2013

Related U.S. Application Data

(63) Continuation of application No. PCT/EP2010/063133, filed on Sep. 7, 2010.

(30) Foreign Application Priority Data

Sep. 7, 2009 (DE) .......................... 10 2009 040 202

(51) Int. Cl.
*B01D 29/07* (2006.01)
*B01D 29/31* (2006.01)
(52) U.S. Cl.
USPC .................... 210/493.1; 210/483; 210/493.3; 210/493.5
(58) Field of Classification Search
None
See application file for complete search history.

(56) References Cited

U.S. PATENT DOCUMENTS

| 6,171,354 | B1 | 1/2001 | Johnson | |
|---|---|---|---|---|
| 2011/0186504 | A1* | 8/2011 | Rocklitz | .................... 210/493.1 |

FOREIGN PATENT DOCUMENTS

| DE | 1299230 B | 12/1966 |
|---|---|---|
| DE | 4328846 A1 | 3/1995 |
| JP | 07047211 A | 2/1995 |
| WO | WO9926711 A1 | 6/1999 |

OTHER PUBLICATIONS

DPMA Office Action DE 10 2009 040 202.0.

* cited by examiner

*Primary Examiner* — Benjamin Kurtz
(74) *Attorney, Agent, or Firm* — James Hasselbeck

(57) ABSTRACT

A filter includes a filter element (1) having a filter medium (106) pleated in a zigzag manner, with a raw side (105) and a clean side (104). Filter medium sections (120) extend on either side of the raw-side pleat tips (102*a*) to adjoining raw-side pleat bases (103*a*) include a first bend (552) toward the raw side (105), and behind that a second bend (554) toward the clean side (104). A plurality of elongated depressions (656) are formed on the raw side (105), which extend between pleat tips (102*a*) and pleat bases (103*a*) approximately perpendicular to pleat edges (F) and implement corresponding elevations (658) on the clean side (104) such that, in a raw-side pleat intermediate space (148*a*), in each case, two depressions (656) on the two medium sections (120) delimiting the pleat intermediate space (148*a*) are located directly opposite of each other and each form a flow channel (660).

9 Claims, 24 Drawing Sheets

FILTER FOR FILTERING FLUIDS

CROSS REFERENCE TO RELATED APPLICATIONS

This application is US National Stage Entry of international patent application no. PCT/EP2010/063133, filed Sep. 7, 2010 designating the United States of America, the entire disclosure of which is incorporated herein by reference. Priority is claimed based on Federal Republic of Germany patent application no. 10 2009 040 202.0, filed Sep. 7, 2009, the entire disclosure of which is incorporated herein by reference.

TECHNICAL FIELD

The invention concerns a filter for filtering fluids, in particular gases, in particular intake air, fuel or motor oil, in particular of an internal combustion engine, in particular of a motor vehicle, or ambient air for introduction into venting systems of buildings or vehicles, comprising a filter element with a zigzag-folded filter medium having a raw side and a clean side.

BACKGROUND OF THE INVENTION

The prior art discloses different filters with folded filter media. In the known flat non-cylindrical folded filter elements, the achievable fold heights are limited, for example, for stability reasons.

SUMMARY OF THE INVENTION

An object of the invention is to provide a stable filter element with fold heights as large as possible and a filter efficiency as high as possible.

This object is solved according to the invention in that at the raw side a plurality of elongate depressions are formed in the filter medium that extend between raw-side fold tips and raw-side fold bases approximately perpendicularly to fold edges of the filter medium and realize at the clean side corresponding projections in such a way that in a raw-side intermediate fold space two depressions, respectively, are positioned directly opposite each other on the two medium sections delimiting the intermediate fold space and each form partially a flow passage.

According to the invention, the raw-side intermediate fold spaces are thus widened like a channel by means of the depressions at several locations. Because of the flow passages, the course of the flow of the supplied fluid is optimized for improving the filtration efficiency, reducing pressure losses at the filter element, and increasing the load capacity. The fluid to be filtered is therefore guided uniformly to the fold bases so that the inflow at the surface of the filter medium is improved. This leads to uniform loading of the raw side with the separated foreign materials. The load capacity of the filter element is thus increased and this extends the service life. Furthermore, the areas of the filter medium that are formed as depressions and projections stabilize the folded filter medium. In this way, filter elements that are tall relative to the fold distance can be built in a stable configuration.

In an advantageous embodiment, at the center of at least one of the depressions a support can be formed which extends along the depression and the corresponding projection and at the raw side forms a recess and at the clean side a raised portion. The support provides for an additional mechanical stabilization of the filter medium so that the risk of collapse, i.e., contacting of neighboring filter media sections in the area of the fold edge is reduced.

Alternatively or additionally, advantageously at the clean side at the center of at least one of the projections an adhesive section can be arranged that extends along the projection. The adhesive section that is preferably extending across the entire height of the intermediate fold space stabilizes the corresponding filter medium section. It reduces the risk of buckling of the filter medium section and collapse of the folds in particular when underpressure occurs.

In a further advantageous embodiment, in a clean-side intermediate fold space two projections, respectively, in particular supports or adhesive sections, on the two medium sections that delimit the intermediate fold space can support each other. As a whole, in this way the mechanical stability of the filter element is improved, in particular the compressibility of the folds and the risk of collapse in particular when underpressure occurs are reduced.

Advantageously, the depths of the depressions across the height of the folds can be substantially constant. Depressions or projections with uniform depth can be realized in a simple way.

Alternatively, advantageously the depths of the depressions may decrease from the fold edges to the fold bases. In this way, the thus formed raw-side flow passages become more narrow toward the fold bases; this positively affects the flow of the fluid to be filtered with regard to filtration efficiency, the pressure losses in the filter element, and load capacity.

In a further advantageous embodiment, between two neighboring flow passages at least one adhesive section can be arranged on the raw side of the filter medium, respectively, so as to extend approximately perpendicularly to the direction of the fold edges. The adhesive sections stabilize the corresponding filter medium sections in order to prevent buckling or collapse. Moreover, the adhesive sections delimit the neighboring flow passages; this has a positive effect on the course of the flow. Advantageously, interruptions of the adhesive can be provided that form a fluid connection between the flow passages. By means of the interruptions of the adhesive it is made possible that a pressure compensation between neighboring flow passages takes place in order to prevent the risk of underpressure in the flow passages and a related collapse of the corresponding folds.

Advantageously, the height of the at least one adhesive section perpendicular to the filter medium may vary so that the adhesive section in the folded filter medium with its free side that is facing away from the filter medium can rest flat on a corresponding free side of an adhesive section that is positioned oppositely in the intermediate fold space or on the surface of the oppositely positioned medium section. In this way, the adhesive sections support the filter medium sections so that the risk of collapse is reduced. As a whole, the stability of the filter element is improved in this way, in particular the compressibility of the filter element is reduced. The adhesive sections bridge the intermediate fold spaces and improve the boundary of the flow passages. This has an advantageous effect on the flow conditions so that the pressure loss at the filter element is reduced and the load capacity is improved.

In a further advantageous embodiment, the depressions and projections can be realized in the form of grooves in the unfolded filter medium that extend perpendicularly to the fold edges. The filter medium, in particular as endless material, can be provided simply in advance in a separate manufacturing process with the appropriate grooves. Alternatively, the initially smooth filter medium can be supplied to an apparatus in which the grooves and the fold lines are produced by embossing. Preferably, in the same production step the adhesive sections can be applied optionally and the filter medium can be folded along the fold lines.

In another advantageous embodiment, at the raw side a plurality of elongate depressions can be formed in the filter medium that extend between raw-side fold tips and raw-side fold bases approximately perpendicularly to the fold edges of the filter medium and realize on the clean side corresponding projections in such a way that in a raw-side intermediate fold space two depressions, respectively, are directly positioned opposite each other on the medium sections that delimit the intermediate fold space and each form partially a flow passage, wherein the flow passage is delimited in particular by means of two lines of adhesive that are arranged between two neighboring depressions and/or projections on the filter medium as well as two neighboring filter medium sections. In this way, the raw-side intermediate fold spaces can be widened like a channel at several locations by means of depressions. By means of the flow passages, the course of the flow of the supplied fluid is optimized for improving the filtration efficiency, reducing pressure losses at the filter element, and increasing the load capacity. The fluid to be filtered is thus guided uniformly to the fold bases so that the inflow at the surface of the filtration medium is improved. This leads to a uniform loading at the raw side with separated foreign materials. The load capacity of the filter element and the service life are increased. Moreover, the areas that are formed as depressions and projections of the filter medium stabilize the folded filter medium. In this way, filter elements that are tall in comparison to the fold distance can be produced in a stable configuration.

In one embodiment of the invention, the filter element is formed of a filter medium that is comprised of cellulose, meltblown fibers, microfibers or nanofibers, woven or knitted fibers, of a nonwoven or a combination of these materials.

In one embodiment of the invention, the filter element comprises a filter medium that is folded multiple times alternatingly in an accordion-like way. In this connection, by means of the filter medium the raw side where the filter element is loaded with the fluid to be purified, is separated from the clean side. Along the fold lines at the filter medium alternatingly raw-side and clean-side fold edges are formed that form fold tips that alternatingly are oriented in the direction of the clean side and the raw side. The spacing between the planes that are formed by the clean-side and raw-side fold tips is defined as fold height. The spacing between two neighboring fold tips is defined as fold distance. The fold base is positioned opposite the fold tips on the other side of the filter medium, i.e., the fold base is the space that is enclosed by the respective fold tip. Accordingly, the clean-side fold tip and the raw-side fold base are positioned at the same fold edge on the opposite sides of the filter medium and vice versa. The two edges of the filter material that extend perpendicularly to the fold edges and alternatingly between raw-side and clean-side fold edges are referred to as end face edges. In the folded state, the end face edges form two opposite end faces. The sides on which the ends of the filter medium are located and that extend in particular parallel to the fold edges are referred to as terminal sides.

In an advantageous embodiment, the fold height is at least 50 mm, advantageously 100 mm or 150 mm and particularly advantageously 200 mm. In a further advantageous embodiment, the filter element has fold heights of at least 300 mm. In this way, the filter element can be provided with a particularly large filter surface area.

In one embodiment, the ratio of fold height to fold distance is at least between 50:1 and 180:1, preferably between 100:1 and 160:1, in particular preferred between 120:1 and 140:1.

In one embodiment, the fold distance is between 7.5 mm and 1.8 mm, advantageously between 2.5 mm and 3 mm.

In one embodiment, the filter medium is grooved or provided with knobs wherein the knobs are introduced into both sides of the filter medium and, in the folded state, are in contact with the respective oppositely positioned filter medium section. This achieves a stabilization of the filter medium.

Alternatively or in addition, embossments can be introduced into the medium which have a large length/width ratio and extend between fold tips and fold base. The embossments are advantageously designed such that in the intermediate fold space two or several embossments are positioned directly opposite each other on opposite medium sections and thus an embossment is supported on an oppositely positioned embossment. It is particularly advantageous to embody the embossments in a wedge shape wherein the wedge, depending on the shape of the intermediate fold space, decreases or increases in the direction of the fold base. Furthermore, the embossments can be advantageously glued to the oppositely positioned embossment, for example, by means of a hotmelt.

In one embodiment, lines of adhesive, for example, of hotmelt adhesive, are introduced in the folds and extend between fold tips and fold base. In this connection, on the clean side as well as on the raw side lines of adhesive are provided. In this connection, before erecting the individual folds, at least two lines of adhesive are applied parallel to each other and perpendicularly to the direction of the fold edges onto the filter medium.

In one embodiment, the lines of adhesive are not continuous but interrupted at regular spacings.

In one embodiment, the lines of adhesive extend between fold tips and fold base but on the clean side and/or the raw side are interrupted regularly.

In an advantageous embodiment, the line of adhesive is interrupted at the raw side at least once between fold tip and fold base, respectively. The interruption is provided in this connection, for example, centrally between fold tip and fold base and has a length of between 10 mm and 80 mm, preferably between 30 mm and 60 mm.

In an advantageous embodiment, at the clean side an interruption of the line of adhesive is provided that surrounds the clean-side fold tip. In this way, the folds at the clean side are not glued together in the area of the fold tips.

Advantageously, at least one, preferably all, lines of adhesive at the raw side can be directly opposite one/the line(s) of adhesive at the clean side.

In an advantageous embodiment, the lines of adhesive that have interruptions are designed such that the interruption of the clean-side line of adhesive and of the raw-side line of adhesive do not overlap. In this way, it is ensured that in the area of the clean side fold tips as well as in the vicinity of the clean-side fold base an overlap of the clean-side line of adhesive and raw-side line of adhesive is formed.

In one embodiment, the at least two lines of adhesive have interruptions that are arranged at the same spacing relative the fold tips and relative to the fold base. The straight lines that are formed by the starting and end points of the individual sections of the lines of adhesive extend in this way parallel to the fold edges.

In an alternative embodiment, the starting and end points of the interruptions of the adhesive are oriented along a plurality of straight lines that extend parallel to each other and are positioned relative to the fold edges at an angle of 10-80 degrees, preferably 45+/−15 degrees.

In a preferred embodiment, the starting and end points of the interruptions of the lines of adhesive extend on at least two sets of straight lines wherein each set of straight lines comprises straight lines parallel to each other wherein the corresponding straight lines on the filter medium cross each other so that an arrow-shaped or zigzag-shaped extension of the interruptions of the line of adhesive on the filter medium is formed.

Alternatively, the starting and end points of the interruptions of the lines of adhesive can be defined by a set of curves wherein the curves in particular have the same shape but in a direction perpendicular (+/−30 degrees) to the fold edges are displaced relative to each other. In this connection, for example, circle or ellipsis sections, sine shapes or other regular oscillation shapes can be used.

In one embodiment, the filter has either at the clean side and/or at the raw side a surface formed by the fold edges that, at least in a partial area, is not positioned parallel to the plane that is formed by the oppositely positioned fold tips. In this way, the filter element can be adapted in a simple way by better space utilization in the area of this side of the filter insert to complex structures in the intake manifold of an internal combustion engine for optimizing the filtering action. By means of good contact of the filter element at the geometry in the intake path, the invention serves for improving the flow behavior at this air inlet side of the filter element.

In an advantageous embodiment at least one part of the surface that is formed by the fold tips at the raw side is positioned at an angle of in particular 0 to 80 degrees, preferably 10 degrees to 45 degrees, especially preferred 10 degrees to 25 degrees, to the surface that is formed by the fold tips at the clean side.

In a particularly advantageous embodiment, the surface that is formed by the raw-side fold tips extends in an area of the filter element parallel to a surface that is formed by the clean-side fold tips and in at least a second edge area of the filter element at an angle of 0-80 degrees, preferably 10 degrees to 45 degrees, especially preferred 10 degrees to 25 degrees, to the surface that is formed by the clean-side fold tips, wherein relative to the edge of the filter element the fold height decreases continuously. In this way, advantageously the inflow conditions in the air filter housing can be adapted to the mounting space conditions. For example, in areas that are loaded less by the flow, in which the particle load of the filter element is reduced, a reduced fold height can be provided. Moreover, in this way the pressure loss at the filter element can be lowered.

In one embodiment, the filter medium comprises a layer of a support and a filter layer at the inflow side wherein the filter layer at the inflow side has a filter layer of fine fibers.

This arrangement has the advantage that at the inflow side the deposition of particles occurs surface-near within the fine fiber layer or in case of appropriately thin fibers, generally nanofibers in this context, completely at the surface of the fine fiber layer. In this way, it is prevented that small particles, in particular soot particles, can penetrate into the filter medium in the area of high flow velocities and clog its interior.

This is in particular advantageous for large fold heights because here the different sections of the filter medium, depending on the position in the filter element, are subjected to loads of different strength. As a result of the inhomogeneous velocity distribution, local blockage of the filter surface area may result therefore in elements with tall folds. Since, as a result of the higher pressure loss, the blocked areas over time are flowed through less, the excess flow velocity area can migrate so that further areas begin to become blocked so that the overall operating life (service life) of the element would be reduced.

In one embodiment, a volumetric ultrafine fiber layer is used and with it a depth filter layer of ultrafine fibers is formed that stores the separated particles distributed across the entire thickness of the ultrafine fiber layer and thus prevents buildup of a dense filter cake. For this purpose, an ultrafine fiber layer of meltblown fibers is used preferably.

In one embodiment, the filter comprises a filter medium in which in the flow-through direction at least one layer of a filter medium is arranged on a support wherein the inflow filter layer comprises a filter layer of fine fibers wherein the fine fibers are arranged in the interior of the filter medium.

In one embodiment, the fine fibers are microfibers or nanofibers.

In one embodiment, at least one layer of a filter medium is arranged on a support wherein the inflow filter layer has a filter layer of fine fibers and the support is a grid of polyamide 6.6.

In one embodiment, the mesh width of the grid is between 100 and 150 μm.

In one embodiment, the filter layer has fibers with an average fiber diameter of 2 μm.

In one embodiment, in the flow-through direction at least one layer of a filter medium is arranged on a support, in particular a cellulose support or a cellulose filter medium, wherein the inflow filter layer has a filter layer of fine fibers.

In one embodiment, the inflow filter layer is a voluminous ultrafine filter layer of meltblown fibers with a thickness in the range of 0.01-0.3 mm wherein the average fiber diameter of the meltblown fibers is in particular approximately 2 μm. In this connection, in particular the lower fiber diameter $d50-2\sigma$ is approximately 700 nm. In an advantageous further embodiment, the weight of the ultrafine fiber layer is in the range of 5-20 g/m$^2$.

In one embodiment, the ultrafine filter layer comprises nanofibers with diameters of 0.01 to 0.5 micrometers. The ultrafine fiber layer of nanofibers has in particular a thickness of less than 1 μm. In this way, the separated particles are deposited on the surface and form a filter cake. The fibers can be produced, for example, by means of electrospray.

In one embodiment, the thickness of the ultrafine fiber layer is 0.08-0.13 mm.

In one embodiment, the weight of the ultrafine fiber layer is 10 g/m$^2$.

In one embodiment, the air permeability of the ultrafine fiber layer is in the range of 500-5,000 l/m$^2$s.

In one embodiment, the air permeability of the ultrafine fiber layer is in the range of 1,000-1,500 l/m$^2$s.

In one embodiment, the material of the ultrafine fiber layer is selected from the group consisting of polybutylene terephthalate, polycarbonate, polypropylene, polyamide, polyethylene terephthalate, polyvinyl alcohol, polyvinyl nitrate, polyvinyl acetate, polyvinyl halide, polyester, polyalkylene terephthalate, polyalkylene naphthalate or polyurethane.

In one embodiment, the support is comprised of a cellulose-based filter medium.

In one embodiment, the weight per surface area of the support is between 50 and 200 g/m$^2$.

In one embodiment, the support has an air permeability between 50 and 100 l/m$^2$s.

In one embodiment, the thickness of the support material is in the range of 0.2-0.5 mm.

In one embodiment, the support is impregnated to be flame resistant.

In one embodiment, the connection between support and ultrafine fiber layer is produced by calendering.

In one embodiment, the ultrafine fiber layer is glued onto the support.

In one embodiment, the filter element has at least two sections in which the surfaces that are formed by the clean-side or raw-side fold tips extend parallel but a different spacing to the respective oppositely positioned surface. The difference in fold height of the at least two sections results in a stepped element which enables better space utilization in mounting spaces of complex shape.

In a further embodiment, also slants, angled or curved contours can be provided at the appropriate side of the filter insert, wherein by means of the continuous zigzag folding a substantially uniform filtering action across the entire filter surface area is ensured. On the other side of the filter element, a uniform planar surface without connecting webs is provided here because the areas of different fold height pass continuously into each other.

In one embodiment, the fold tips have a shape that corresponds to a wedge or alternatively a truncated wedge. This means that the fold tip in the case of a truncated wedge shape at the center along the fold edge has a plateau which is substantially parallel to the plane that is formed by the fold tips. On either side of the plateau, narrow transition areas of the fold tips adjoin that, relative to the plateau, are positioned at an angle of 45 (+35/−30) degrees, preferably 45 degrees to 80 degrees. The width of the plateau area is at most one fourth, preferably at most one fifth, and particularly preferred at most one sixth of the fold distance. In the case of the wedge shape, the transition areas are positioned at an angle of 90+/−30 degrees, preferably 60 degrees to 90 degrees, and pass with a pointed fold edge directly into each other. The width of the transition areas in the case of the wedge shape is at most 35%, preferably at most 25%, of the fold distance, in case of the truncate wedge at most one fourth, preferably at most one fifth, and especially preferred one sixth, of the fold distance.

In one embodiment, the fold tips have a multi-step shape wherein in a first area, beginning at the fold edge, the two filter medium sections are substantially resting directly on each other or are positioned at an angle of less than 10 degrees, preferably less than 5 degrees. The first area extends in this connection across a length of less than 10 mm, preferably 5 mm+/−0.2 mm. In an adjoining transition area with a length of less than 10 mm, preferably 5 mm+/−0.2 mm, the oppositely positioned filter medium sections are positioned relative to each other at an angle of 10 degrees to 40 degrees, preferably of 18 to 30 degrees, particularly preferred 20 to 25 degrees. Across the remaining extension of the fold, the oppositely positioned filter medium sections extend substantially parallel and preferably are positioned relative to each other at an angle of 0 degrees to 0.2 degrees or alternatively 0 degrees to −0.2 degrees.

In one embodiment, the open cross-sectional surface between two folds formed at the raw side and/or clean side where the medium to be purified flows in or where the purified medium flows out is smaller than the base surface of the correlated fold base. This means that the distance, which two filter medium sections defining a fold of the filter bellows have relative to each other, is smaller in an end area at the open side of this fold than in the area in which the filter medium sections converge and are connected.

In a preferred embodiment, the ratio of the raw-side open cross-section between two fold tips at the raw side relative to the base surface positioned within the same intermediate space at the bottom and formed by the fold base is smaller than 1, preferably smaller than 0.85, further preferred smaller than 0.7 and particularly preferred smaller than 0.4.

In one embodiment, the end faces are sealed by means of continuous lines of adhesive. In this connection, at least on the clean side each fold is closed off by hotmelt that, in the unfolded state, is applied in a continuous line at the edge of the filter medium and upon erection of the folds closes off the latter relative to the end face. In a further embodiment, also in the edge area also a continuous or interrupted line of adhesive is applied onto the raw side of the filter element for stabilization of the filter element.

In one embodiment, the sealing action at the end faces is realized by a textile material or fabric, for example, nonwoven, in particular polyester nonwoven, that is provided with a coating of hotmelt. For sealing the end faces, the coated side of the fabric is contacted with the filter bellows. In this connection, the coating of hotmelt can be heated by means of infrared radiation before application to the end face and subsequently, in the plastic state, is attached to the filter bellows. The hotmelt penetrates into the folds of the filter medium and solidifies upon cooling. Alternatively or additionally, the coating can be heated from the exterior by infrared radiation or by contact with a hot counter member when the coating of hotmelt is in contact with the end face of the filter bellows.

In a further embodiment, the filter element has a flat seal at the end faces with plastic material.

In one embodiment, the flat seal is formed by a substantially plate-shaped plastic part that is adhesively attached flat to the end face of the filter bellows by means of a hotmelt.

In one embodiment, the flat seal is formed by a cast polyamide, for example, polyamide 6 with starting material $\epsilon$-caprolactame. It is provided in a casting mold in liquid state, subsequently the end face of the filter element is immersed into the still liquid plastic material. The plastic material hardens in the shape of the casting mold at the end face of the filter element and thus closes off the end face. Alternatively, into the casting mold a polyurethane can be introduced which upon curing will foam and penetrate between the folds at the end face. In this way, a lightweight and flexible seal can be achieved.

In another embodiment, the flat seal at the end faces is realized by means of a thermally softenable plastic material, for example, polypropylene, polyamide, polyoxymethylene. In this connection, a substantially plate-shaped plastic part is heated at the side that is to be attached to the end face by infrared radiation up to the range of the melting point and subsequently is pressed against the end face of the filter bellows. In this way, the filter medium penetrates with its end face edges into the softened plastic material and is joined thereto upon solidification of the plastic material.

In another embodiment, the flat seal at the end faces is realized by a thermally softenable material that swells when exposed to heat, in particular nitrile rubber. In this connection, a film of this material is pressed against the end faces of the filter bellows and heated at the same time. This causes the material to soften, swell, enclose the end face edges of the filter medium. Subsequently, the material hardens so that a fast and positive-locking connection of the material with the filter medium is produced. In an advantageous further embodiment, during the connecting process a nonwoven layer is introduced into the outwardly positioned surface of the thermally softenable material that is facing away from the filter medium. It is connected with the thermally softenable material in the same way as the filter medium. This has the advantage that a uniform surface and, moreover, an additional stabilization of the flat seal are achieved.

In one embodiment, the filter element has a circumferentially extending frame made of plastic material that covers at least partially the surfaces of the filter element that are not flowed through. In this connection, the frame parts at the end faces can be formed by the flat seal of plastic material or additional frame parts can be provided that surround the end faces.

In an advantageous embodiment, the frame has a circumferentially extending seal which serves for separating the raw side and the clean side. It can act axially and can be attached to the frame on the raw side of the filter element. In this connection, the seal can be oriented in axial direction perpendicularly to the raw-side inflow surface that is formed by the raw-side fold tips and can be contacted with a seal surface of the housing above the inflow surface. Alternatively, the seal can be provided below the inflow surface so as to extend circumferentially about the filter element wherein the sealing action is realized circumferentially about the filter element in a plane between inflow side and outflow side.

Moreover, a radially outwardly acting seal can also be provided which is connected to a circumferentially extending frame part which projects past the raw-side inflow surface that is formed by the raw-side folds tips.

BRIEF DESCRIPTION OF THE DRAWINGS

Further advantages, features, and details of the invention result from the following description in which embodiments of the invention will be explained in more detailed with the aid of the Figures. A person of skill in the art will expediently consider the features disclosed in combination in the drawing, the description and the claims also individually and combine them to other meaningful combinations. It is shown in:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
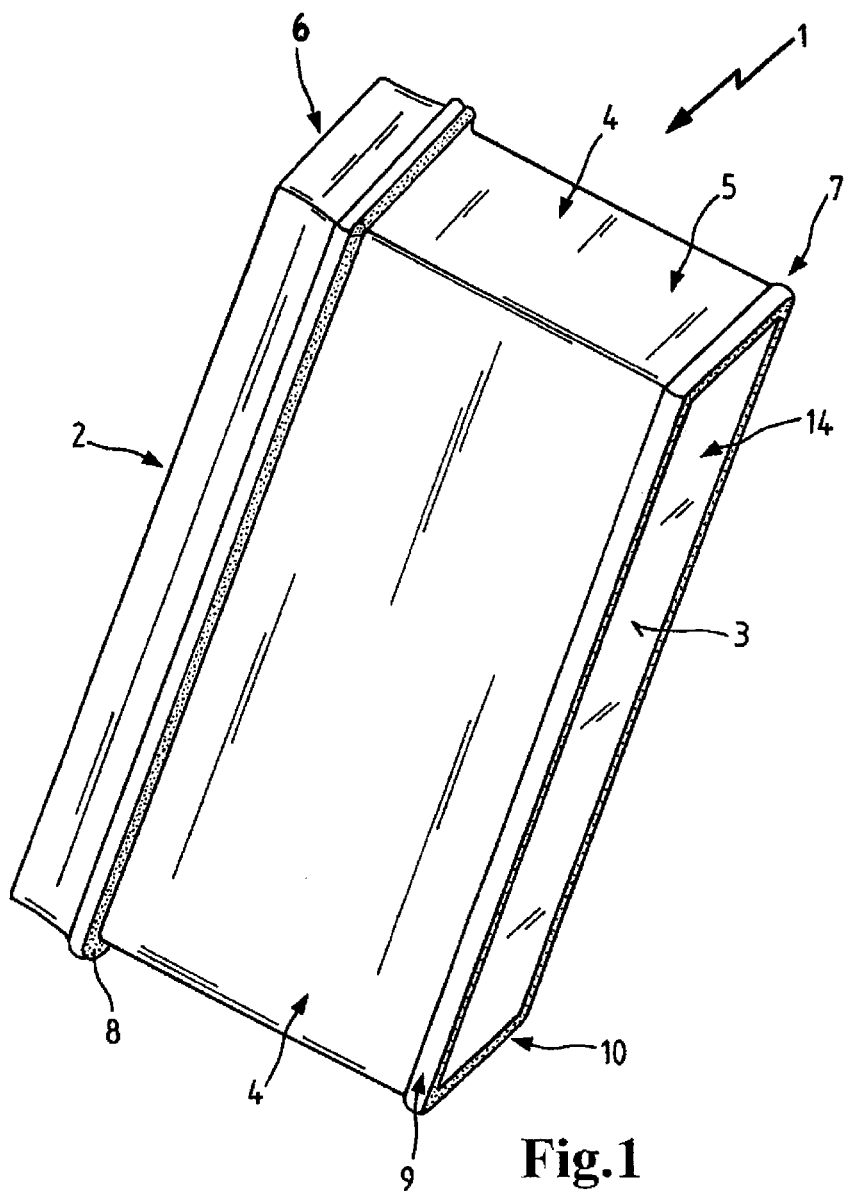
FIG. 1, a view of an embodiment of a filter in accordance with the invention.

FIG. 1 shows a filter element 1 with a raw-side inflow side 2 and a clean-side outflow side 3. The filter element is formed by a filter medium 14 that is folded multiple times wherein the folds extend between the inflow side and the outflow side, i.e., fold tips are positioned at the inflow side and at the outflow side, respectively. The lateral surfaces of the filter element 4 that are not flowed through are enclosed by a polyester nonwoven that is provided on the side that is facing the filter element with a hotmelt layer. This hotmelt layer provides a flat adhesive connection of the polyester nonwoven with the filter element whereby also the end face 5 of the filter bellows is sealed. The filter element 1 comprises a main frame 6 and an auxiliary frame 7 wherein the main frame supports an axial seal 8 that seals in the direction of the outflow side 3 and is introduced into a groove of the main frame or into a groove between main frame and lateral surfaces 4. The auxiliary frame is connected to the lateral surfaces 4 by an adhesive connection and has radial surfaces 9 and axial surfaces 10 for supporting the filter element in a housing, not illustrated.

Figure 2:
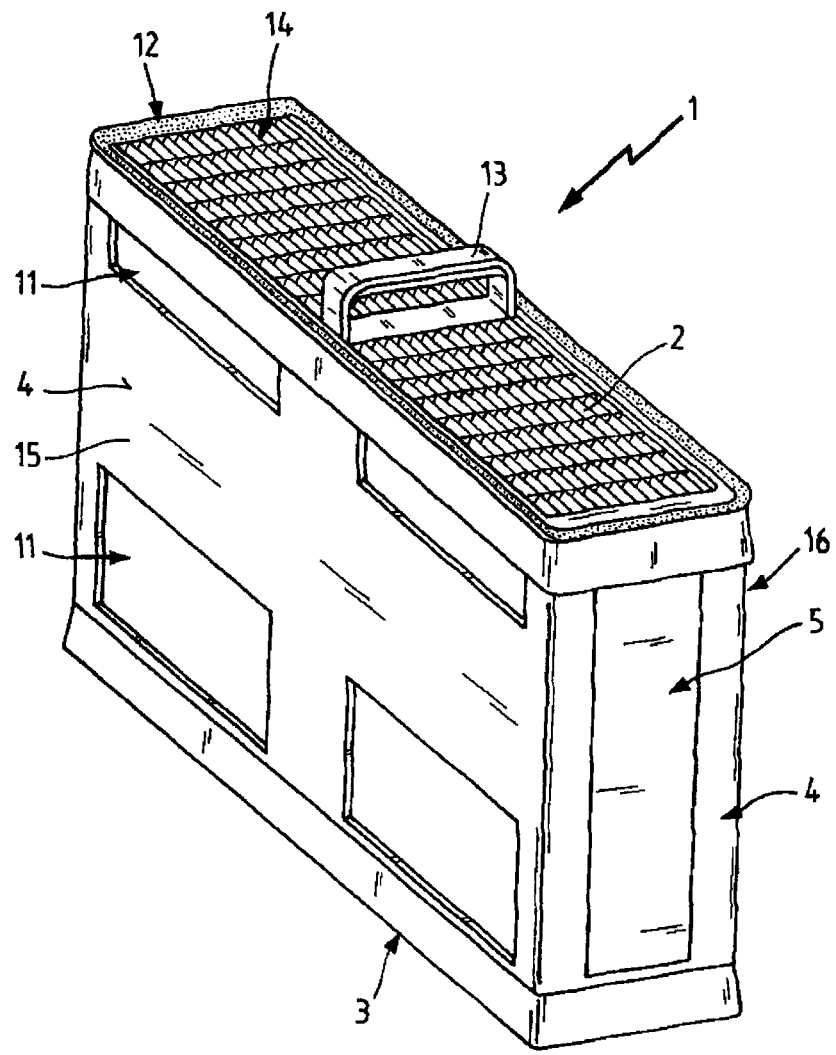
FIG. 2, a view of a further embodiment of a filter according to the invention.

FIG. 2 shows an embodiment of a filter element 1 with a raw-side inflow side 2 and a clean-side outflow side 3. At the lateral surfaces 4 of the filter element 14 that are not flowed through a plastic frame 16 is attached by means of a hotmelt connection wherein on the end faces 5 by means of the hotmelt also the sealing action of the end face is realized. On the end faces 15 openings 11 are introduced into the plastic frame 16. The plastic frame 16 supports on the inflow side 2 an axial seal 12 which can be engaged by a sealing surface of a housing, not shown. Moreover, a grip 13 is provided that is connected with the plastic frame 16 and serves for improved handling of the filter element 1.

Figure 3:
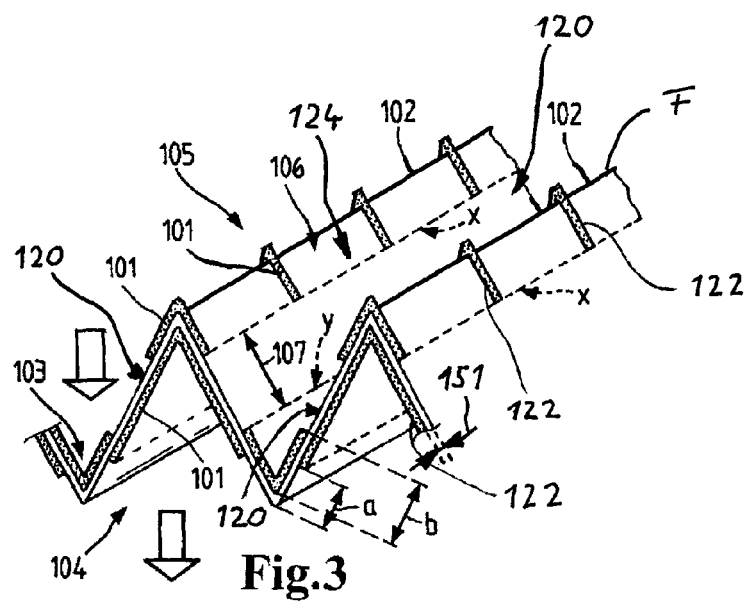
FIG. 3, a detail view of an arrangement of the lines of adhesive on a filter according to the invention.

FIG. 3 shows a detail view of an arrangement of the lines of adhesive on a filter element according to the invention. In this embodiment, lines of adhesive 101 of hotmelt are introduced into the folds and extend between the fold tips 102 and the fold base 103. In this connection, on the clean side 104 as well as on the raw side 105 lines of adhesive 101 are applied. Before erecting the individual folds, at least two lines of adhesive 101 are applied parallel to each other and perpendicular to the direction of the fold edges 102, 103 onto the filter medium 106. The lines of adhesive 101 are not continuous but are interrupted at regular spacings by an interruption 107. At the raw side 105 the line of adhesive is interrupted once between fold tip and fold base. The interruption 107 is located centrally between fold tip and fold base and corresponds in its length to one third up to one half of the fold height. The interruption 107 begins at a spacing b from the raw-side fold base 103. Accordingly, the folds at the raw side are glued only in the area of the fold base and fold tips. At the clean side, an interruption of the line of adhesive across a length a is provided which surrounds the raw-side fold tip. Accordingly, the folds at the raw side are not glued in the area of the fold tips.

The spacings a and b of the raw-side fold base and clean-side fold tip are configured such that the interruption 107 of the clean-side and the raw-side lines of adhesive do not overlap. In this way, it is ensured that in the area of the clean-side fold tips as well as in the vicinity of the clean-side fold base an overlap of the line of adhesive 101 of the clean side 104 and raw side 105 is formed.

The straight lines x and y formed by the starting and end points of the individual sections of the lines of adhesive extend parallel to the fold edges.

Figure 4:
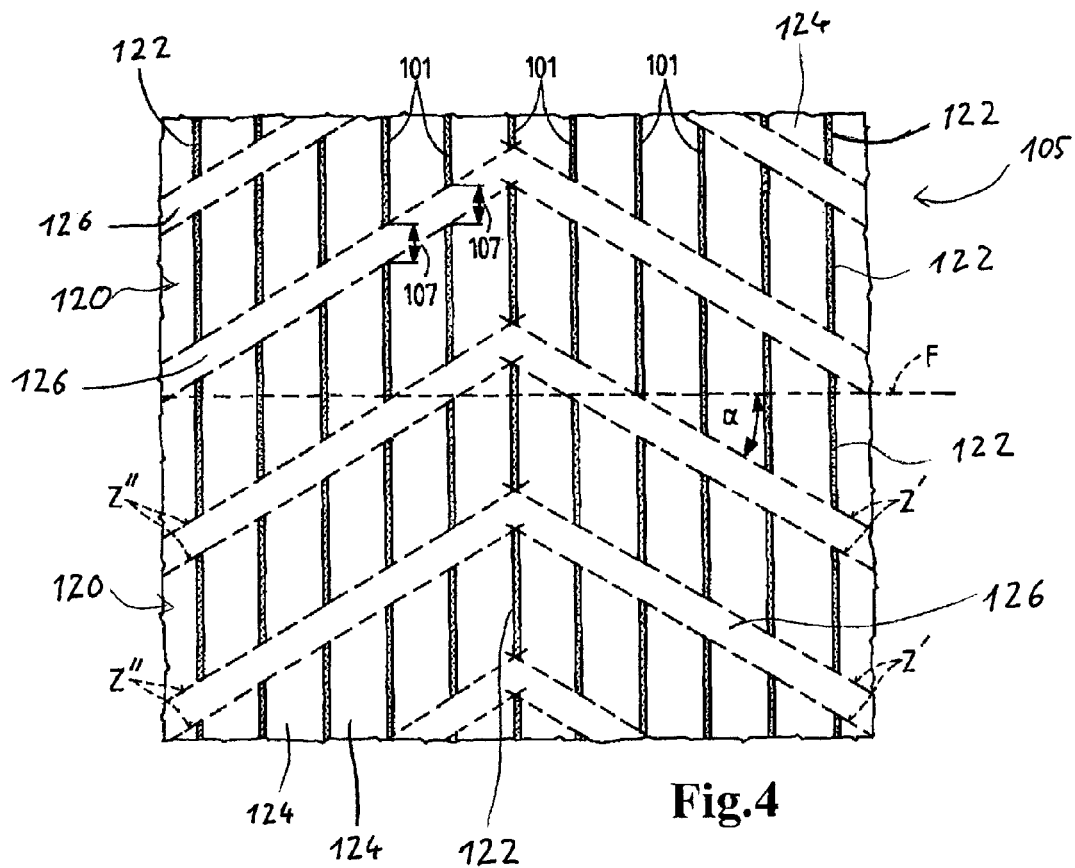
FIG. 4, a detail view of an alternative arrangement of the lines of adhesive on a filter according to the invention.

FIG. 4 shows an alternative arrangement of the lines of adhesive on a filter element according to the invention. In this embodiment, the start and end points of interruptions of the lines of adhesive 101 are aligned relative to a plurality of straight lines z that extend parallel to each other and form with the fold edges F an angle α of 10 to 80 degrees, preferably 45+/−15 degrees. In this connection, the starting and end points of the interruptions of the lines of adhesive extend along at least two sets of straight lines z' and z", wherein each set of straight lines comprises straight lines parallel to each other, wherein the corresponding straight lines on the filter medium cross each other so that an arrow-shaped or zigzag-shaped course of the interruptions 107 of the lines of adhesive 101 is formed on the filter medium.

Figure 5:
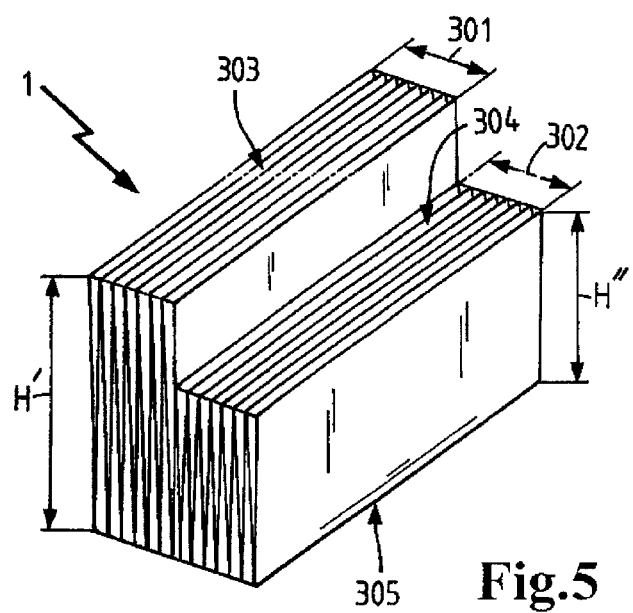
FIG. 5, an embodiment of the outer shape of a filter according to the invention.

FIG. 5 shows an embodiment of the outer shape of a filter element 1 according to the invention. In this embodiment, the filter element has at least two sections (301, 302) in which the surfaces 303 and 304 that are formed by the raw-side fold tips extend parallel but at a different spacing H(H', H") relative to the respective oppositely positioned surface 305. The difference in fold height of the at least two sections results in a stepped element that enables a better spatial utilization in mounting spaces of a complex shape.

Figure 6:
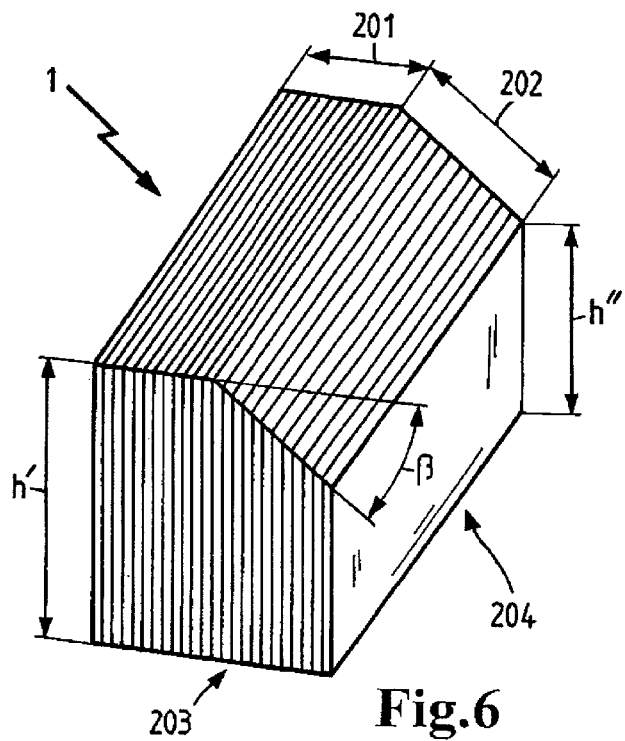
FIG. 6, a further embodiment of the outer shape of a filter according to the invention.

FIG. 6 shows an embodiment of the outer shape of a filter element 1 according to the invention. In this embodiment, the surface area that is formed by the fold tips at the raw side extends in an area 201 of the filter element parallel to the surface that is formed by the clean-side fold tips and in at least one second edge area 202 of the filter element at an angle β of 30 degrees relative to the surface 203 formed by the clean-side fold tips, wherein relative to the edge 204 of the filter element 1 the fold height h (h', h") decreases continuously.

Figure 7:
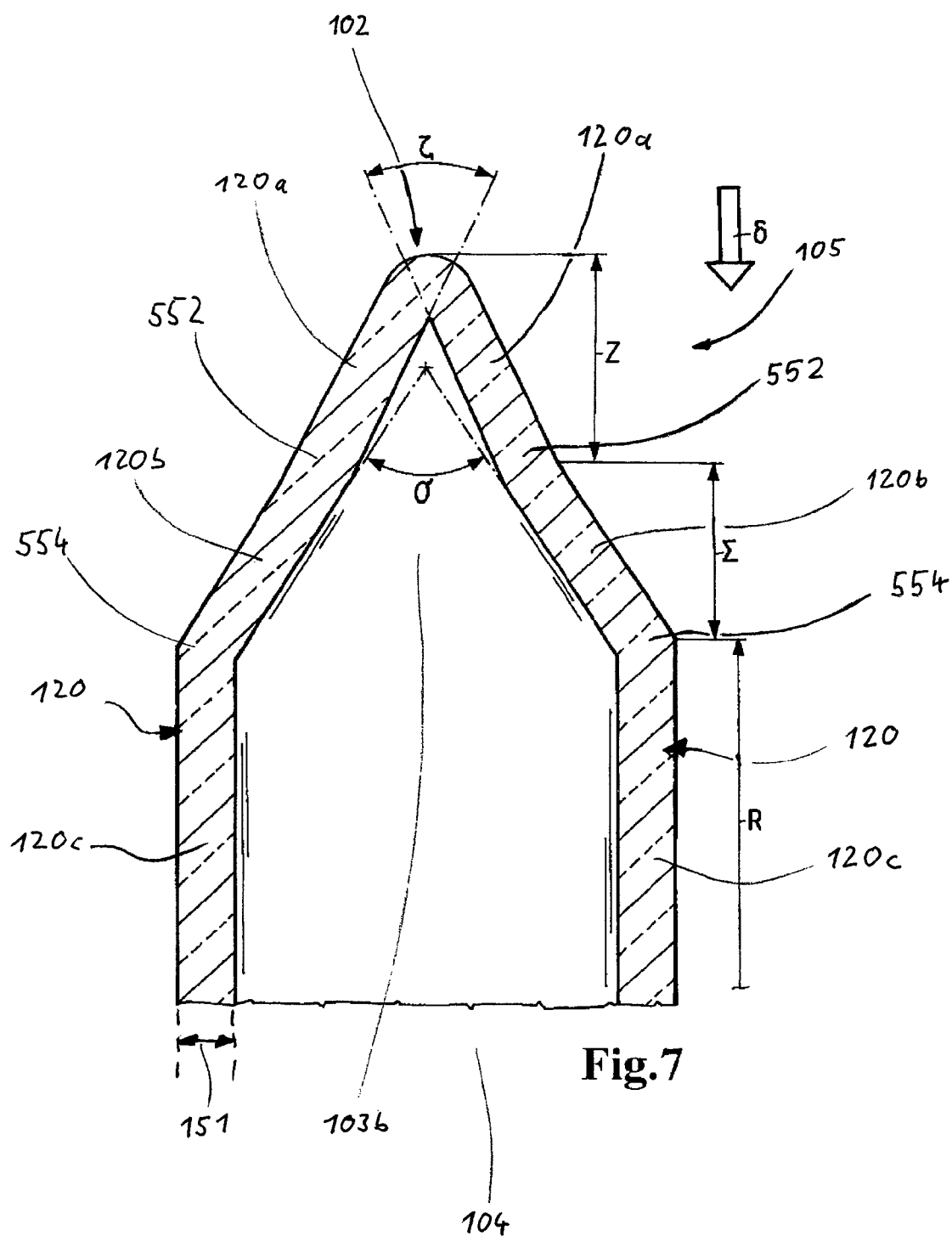
FIG. 7, an embodiment of a fold tip of a filter according to the invention.

FIG. 7 shows an embodiment of a raw-side fold tip of a filter according to the invention. In this embodiment, the fold tips have a multi-step shape wherein in a first area Z beginning at the fold edge the two filter medium sections have an angle ζ relative to each other that is smaller than 5 degrees. The first area extends in this context across a length Z of approximately 5 mm. In an adjoining transition area Σ with a length Σ of approximately 5 mm, the oppositely positioned filter medium sections are positioned at an angle σ of approximately 24 degrees relative to each other. Across the remaining course R of the fold, the oppositely positioned filter medium sections extend substantially parallel and, in comparison to the aforementioned angles, are positioned relative to each other at a negative angle of approximately 0.2 degrees so that the clean-side spacing of the two filter medium sections becomes smaller along the further course in the flow-through direction δ. This has the result that the cross-section of the intermediate spaces at the raw side adjoining this fold at both sides to the right and to the left become larger in the direction of the flow-through direction δ.

Figure 8:
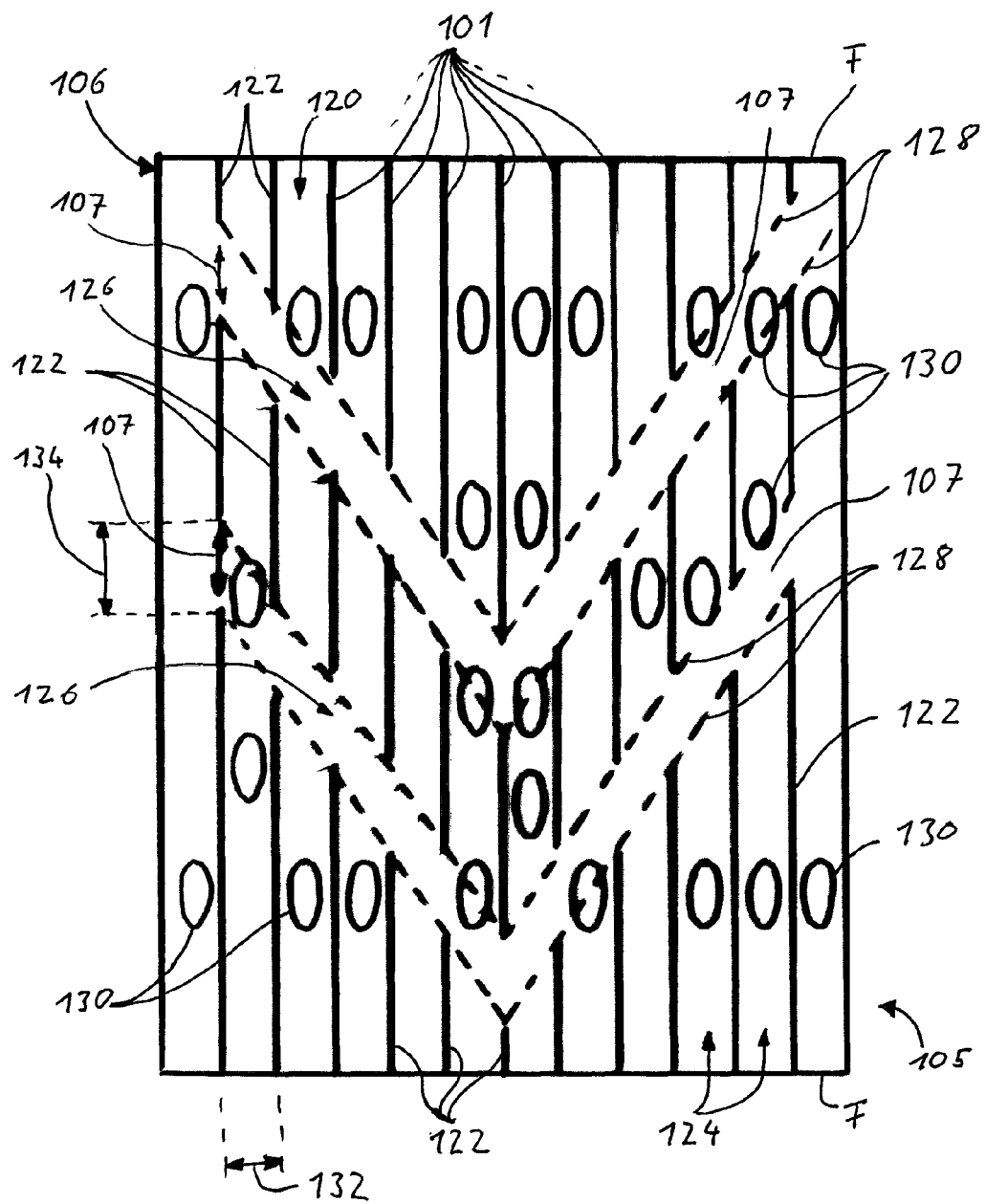
FIGS. 8 to 12, schematic detail views of different arrangements of lines of adhesive on a filter medium similar to the arrangement of FIG. 4.

In FIG. 8, a section of a filter medium 106 is shown which is similar to the filter media 106 of FIG. 3 and is used in filter elements for filters similar to the filter elements 1 of FIGS. 1, 2, 5 and 6. FIG. 8 shows the raw side 105 of a medium section 120 of the filter medium 106 that extends between two fold edges F. The fold edges F are embossed as folding lines in the unfolded filter medium 106. In the folded filter medium 106, the fold tips 102 surround the fold edges F.

On the filter medium 106, a plurality of elongate adhesive sections 122 extends along straight lines of adhesive 101. The lines of adhesive 101 extend equidistantly parallel to each other and perpendicularly to the fold edges F. A spacing 132 between two neighboring lines of adhesive 101 is approximately 25 mm, respectively.

Along each of the lines of adhesive 101, two interruptions 107 of the adhesive of identical length are arranged between the adhesive sections 122. The width 134 of the interruptions 107 of the adhesive perpendicular to the fold edges F is approximately 15 mm. The interruptions 107 of the adhesive of neighboring lines of adhesive 101, viewed in the direction of the fold edges F, are displaced relative to each other.

Figure 19:
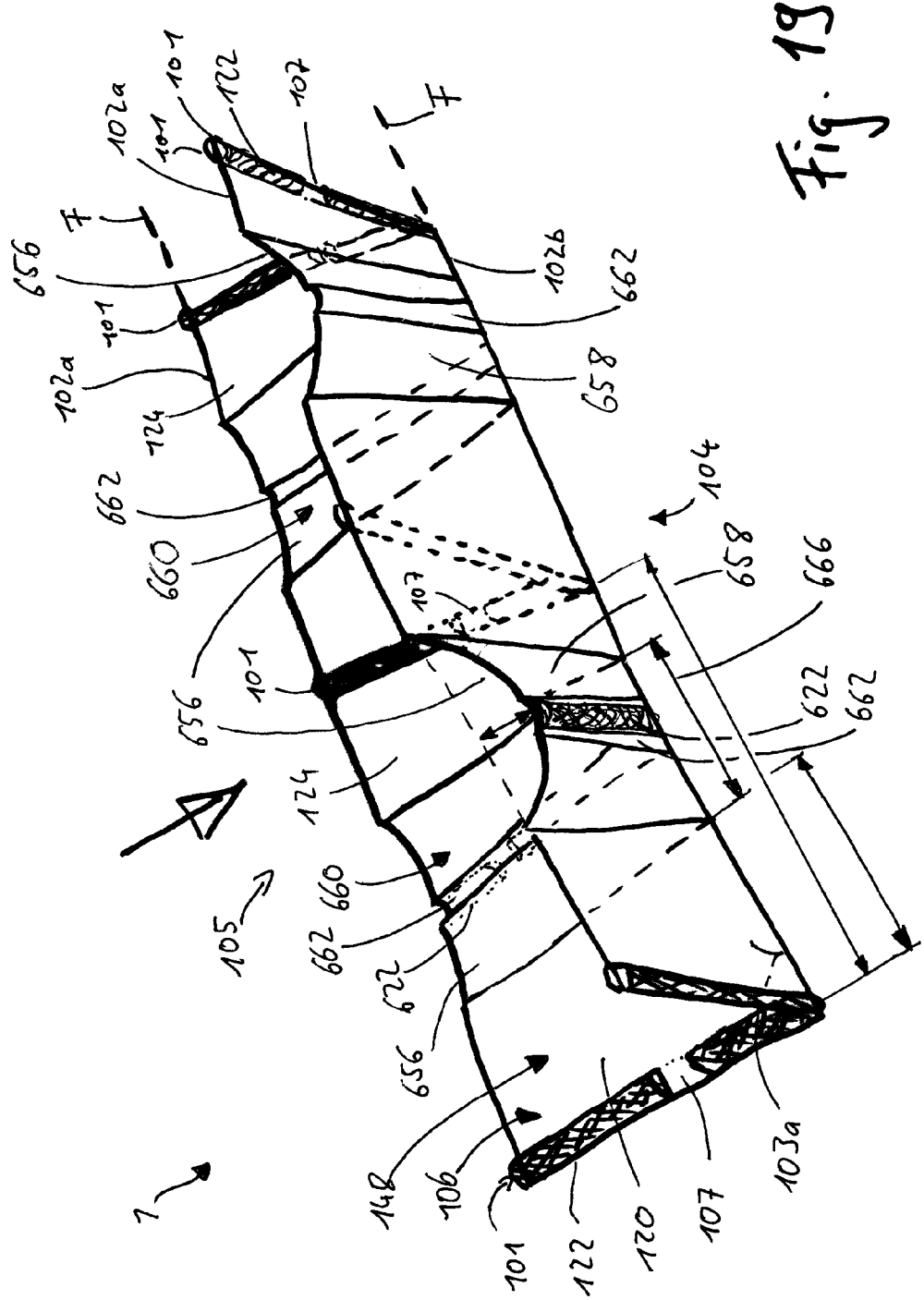
FIG. 19, an isometric detail view of a further embodiment of a filter element in which at the raw side depressions that extend perpendicularly from the fold base to the fold tips are formed in the filter medium.

The adhesive sections 122 of neighboring lines of adhesive 101 delimit each a passage part 124 of a passage that extends in the raw-side intermediate fold space 148*a* of the folded filter medium 106 between the fold edges F, similar to the embodiment to be explained farther down in connection with FIG. 19. The interruptions 107 of the adhesive connect the respective neighboring passage parts 124.

The interruptions 107 of the adhesive of the neighboring lines of adhesive 101 realize two passages 126 that, in the embodiment shown in FIG. 8, are extending parallel in a V-shape and slanted relative to the fold edges F, respectively. The passages 126 in FIG. 8 are defined by two V-shaped curves indicated in dashed lines in the form of imaginary straight lines 128. The straight lines 128 are similar to the sets of straight lines z' and z" according to the embodiment of FIG. 4. The straight lines 128 extend through the corresponding end points of the adhesive sections 122. Because of the displaced arrangement of the interruptions 107 of the adhesive it is avoided that the passages 126 extend continuously parallel to the fold edges F.

In FIG. 8, risk areas 130 of the filter medium 106 which, upon operation of the filter without use of the indicated adhesive sections 122 with interruptions 107 of the adhesive according to the invention, could collapse, for example, as a result of underpressure, are shown as elliptical curves in an exemplary fashion.

Figure 9:
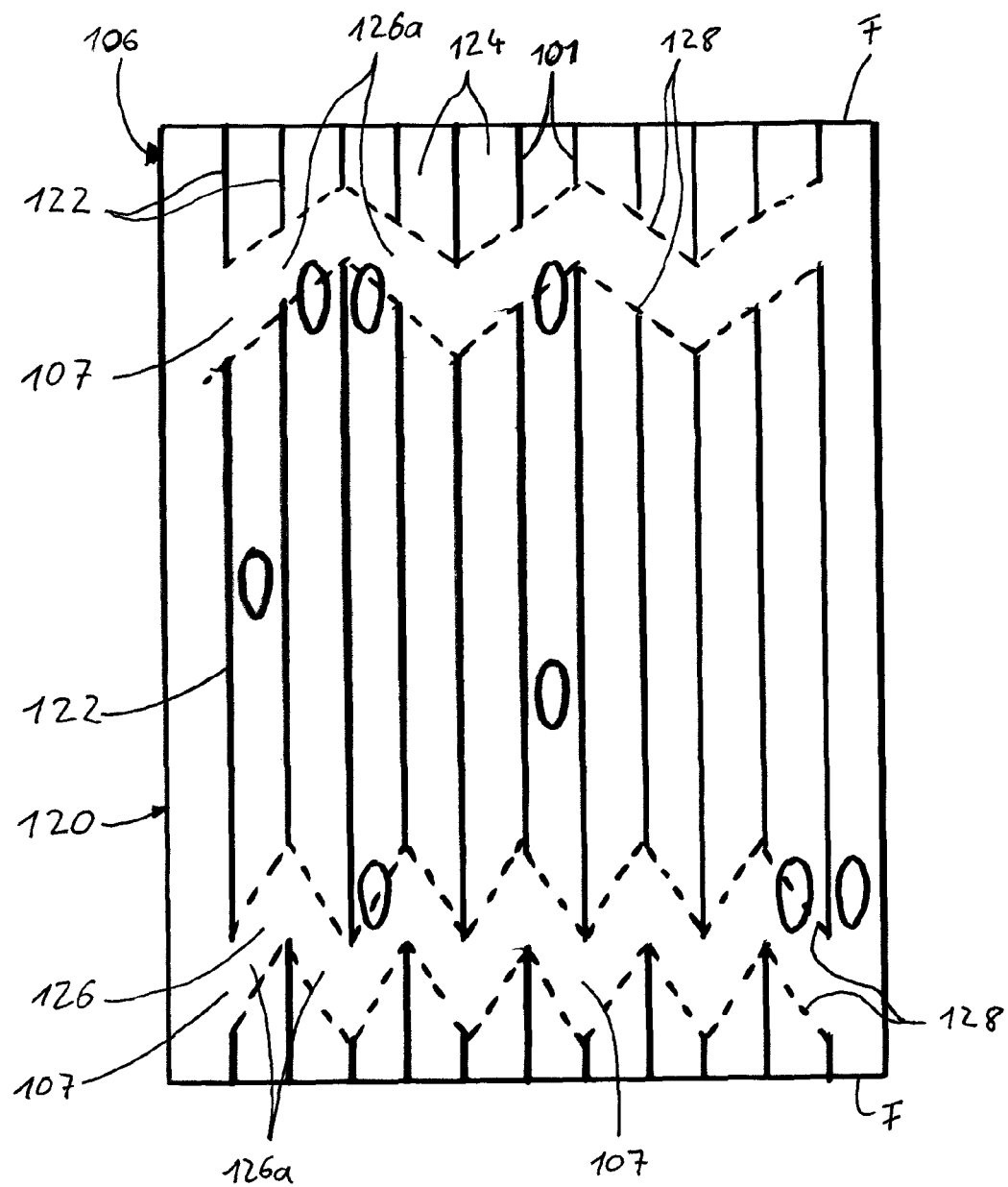

In FIG. 9, a further embodiment of a filter medium 106 is shown which is similar to the embodiment of FIG. 8. In contrast to the embodiment of FIG. 8, the interruptions 107 of the adhesive are arranged in the embodiment of FIG. 9 such that the passage 126 shown at the top in FIG. 9 extends zigzag-shaped wherein the flanks 126a extend across three neighboring lines of adhesive 101, respectively.

The passage 126 shown in FIG. 9 at the bottom extends also in a zigzag-shape. However, in this configuration, the flanks 126a extend across two neighboring lines of adhesive 101, respectively. The use of two differently extending passages 126 improves the stability of the filter medium 106.

Figure 10:
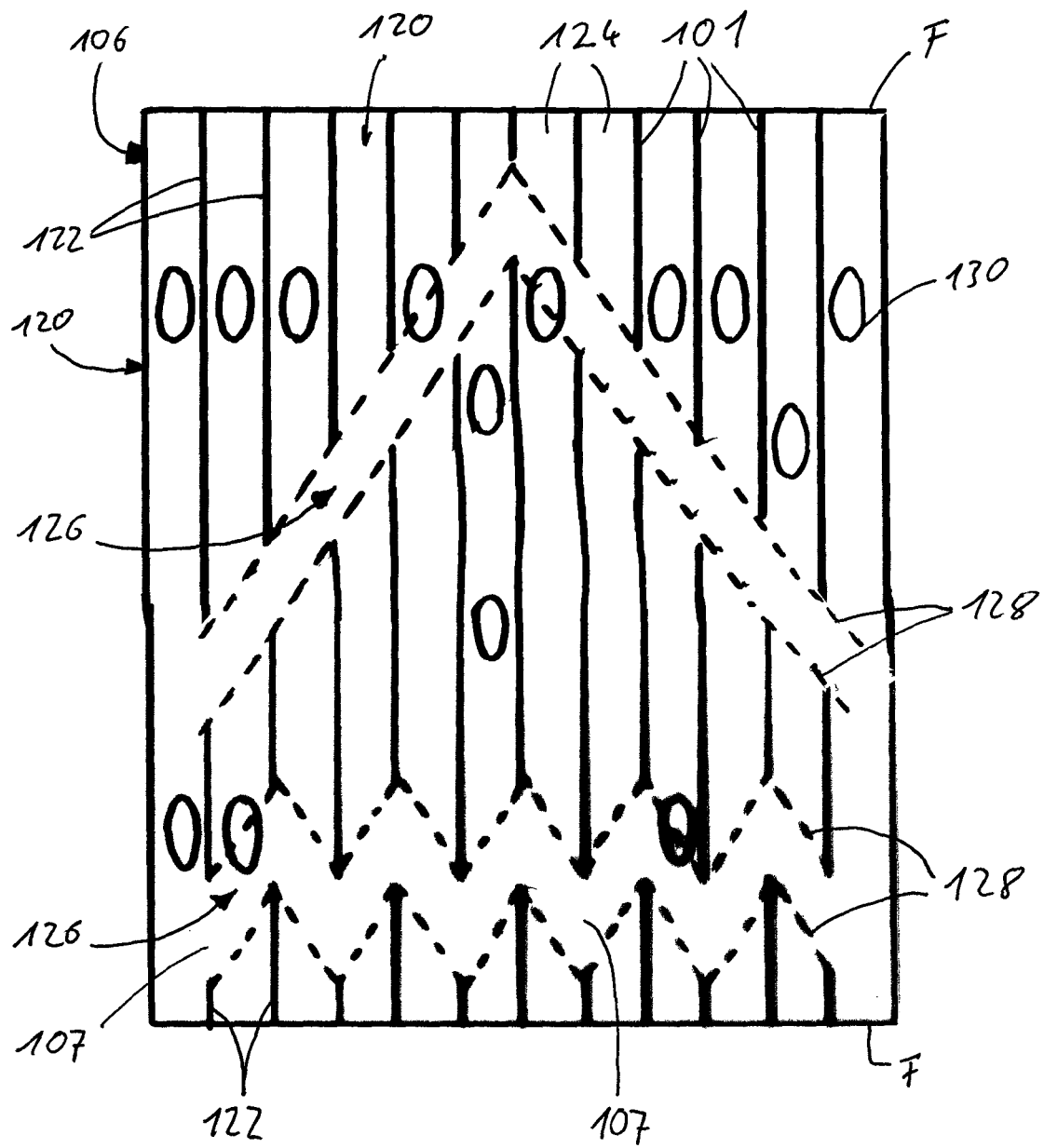

A further embodiment of a filter medium 106 according to FIG. 10 is similar to the filter medium 106 of the embodiments according to FIGS. 8 and 9. In this embodiment, in FIG. 10 at the top a passage 126 in the form of an upside down "V", similar to the "V" in the embodiment of FIG. 8, and at the bottom a passage 126 with zigzag-shaped course, as in the embodiment of FIG. 9, are realized.

Figure 11:
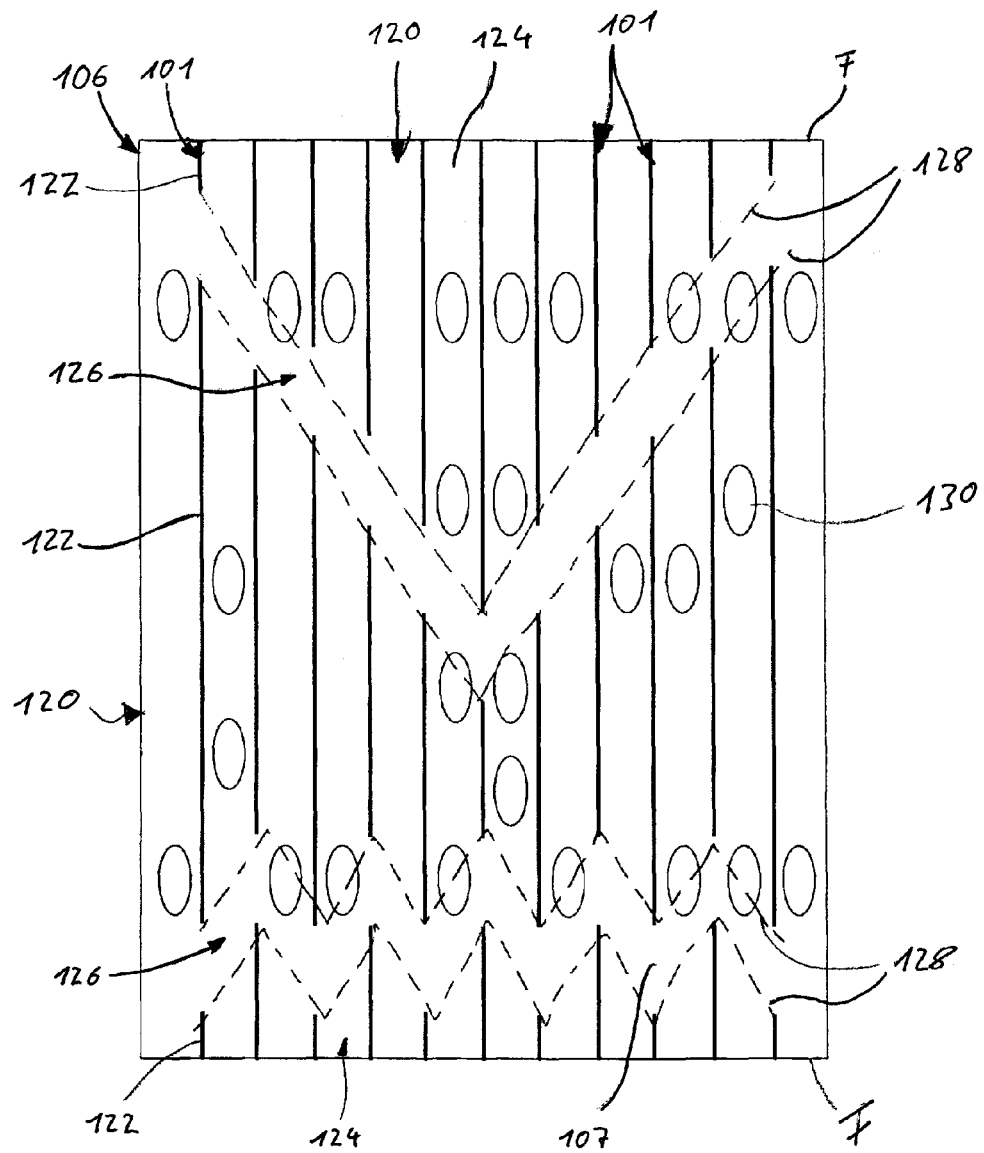

A further embodiment according to FIG. 11 is similar to the embodiment of FIG. 10, wherein here the passage 126 shown at the top in the Figure is oriented as a "V", as in the embodiment of FIG. 8.

Figure 12:
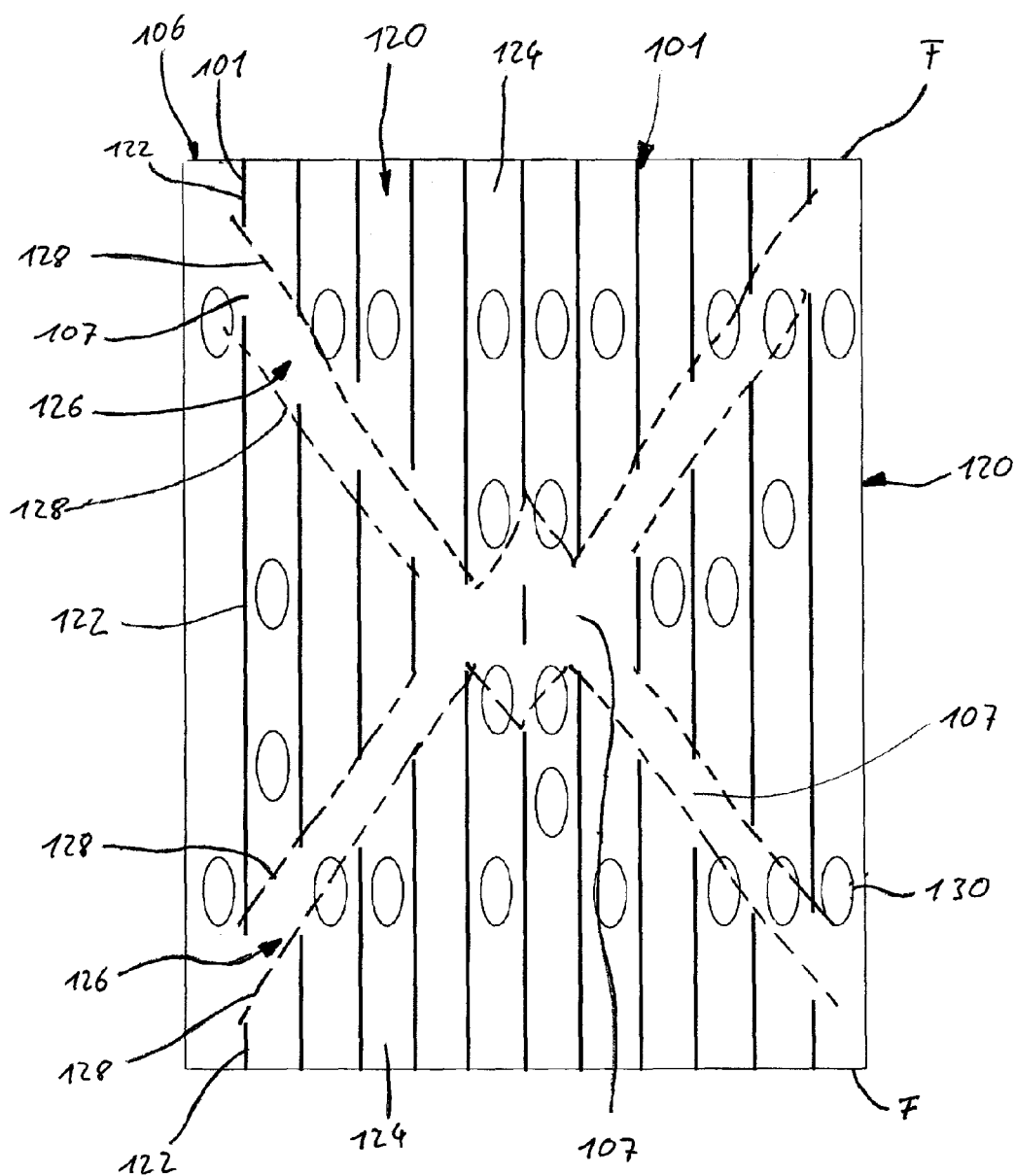

In a further embodiment of a filter medium 106 according to FIG. 12, which is similar to the embodiment of FIGS. 8 to 11, an upper passage 126 at the upper end of the FIG. 12 has the shape of a "W". A passage 126 shown at the bottom of FIG. 12 has the shape of an upside-down "W".

The passages 126, as they are shown in FIGS. 8 to 12, can be combined in other ways also. For example, more or fewer than two passages 126 can be provided between two fold edges F. Identical or different lengths 134 of the interruptions 107 of the adhesive can be provided along the lines of adhesive 101 and/or in case of different lines of adhesive 101. The lengths 134 can also be smaller or greater than 20 mm. Also, the spacings 132 of the lines of adhesive 101 can be different, also smaller or greater than 25 mm.

On the clean sides of the medium sections 120, not shown in FIGS. 8 to 12, also adhesive sections and interruptions of the adhesive along the lines of adhesive can be arranged. They can be arranged preferably such that the adhesive sections 122 at the clean side 105 project on both sides past one of the interruptions of the adhesive on the clean side, respectively, and overlap the adhesive sections neighboring the corresponding clean-side interruption of the adhesive at the ends.

On the other hand, the adhesive sections on the clean side can likewise project past the interruptions 107 of the adhesive at the raw side 105.

Figure 13:
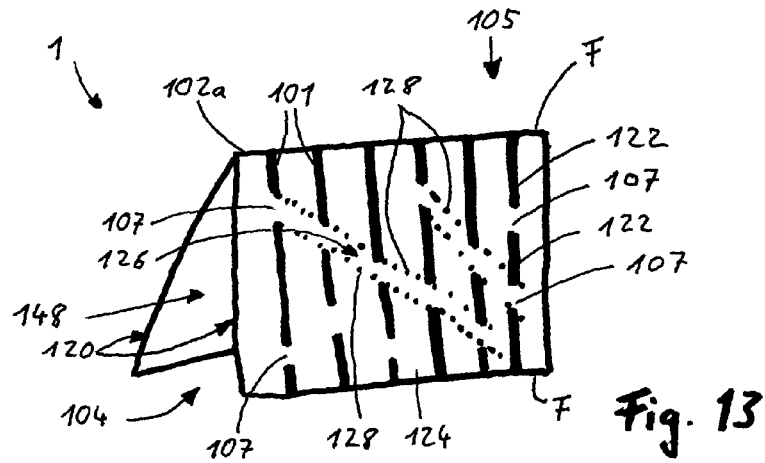
FIGS. 13 to 15, schematic isometric illustrations of a fold of the filter element of the filter similar to the filter of FIGS. 1 to 7, wherein here the lines of adhesive are arranged at different spacings relative to each other.

In FIG. 13, a detail of a filter element 1 is illustrated which is similar to the filter elements 1 of FIGS. 1, 2, 5 and 6. In FIG. 13, two medium sections 120 are shown that extend on either side of one of the fold tips 102a at the raw side.

At the raw side 105 of the filter medium 106, similar to the embodiment of FIGS. 3, 4, and 8 to 12, a plurality of adhesive sections 122 and interruptions 107 of the adhesive along equidistant lines of adhesive 101 are arranged. The lines of adhesive 101 extend perpendicularly to the fold edges F.

Figure 14:
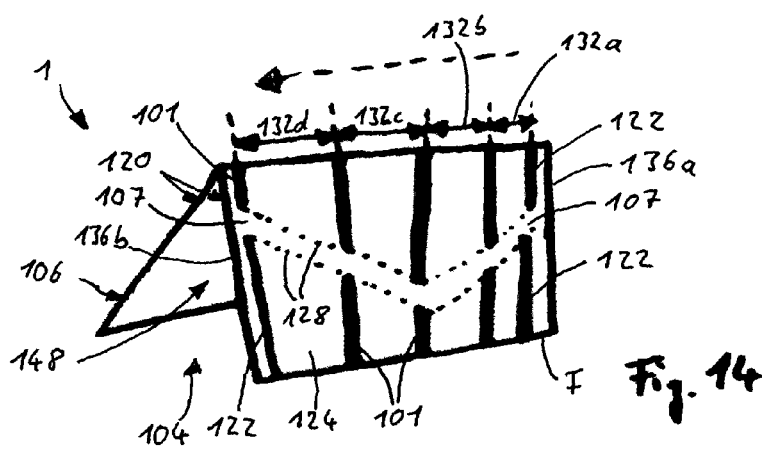

In an embodiment illustrated in FIG. 14 that is similar to the embodiment of FIG. 13, the spacings 132a, 132b, 132c between the lines of adhesive 101 increase from an edge 136a of the filter element 1 to the right of FIG. 14 to a left edge 136b.

Figure 15:
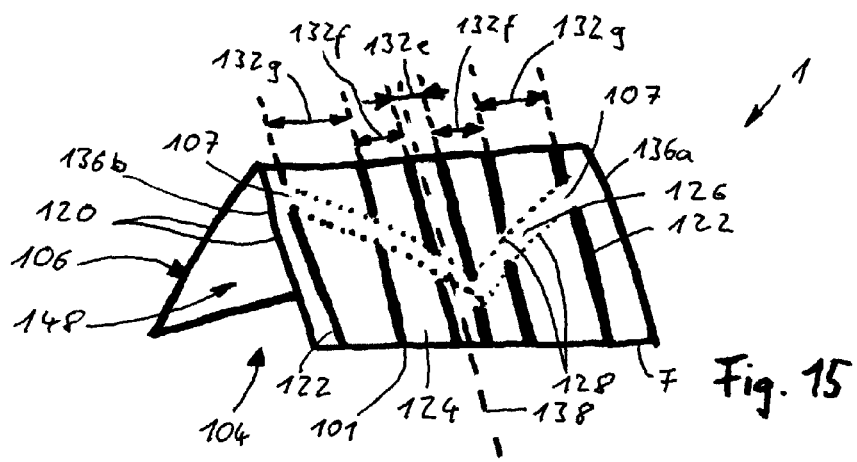

In a further embodiment of a filter element 1 illustrated in FIG. 15, the spacings 132e to 132g increase mirror-symmetrically relative to a central plane 138 that extends centrally between the edges 136a and 136b from the interior to the exterior.

Figure 16:
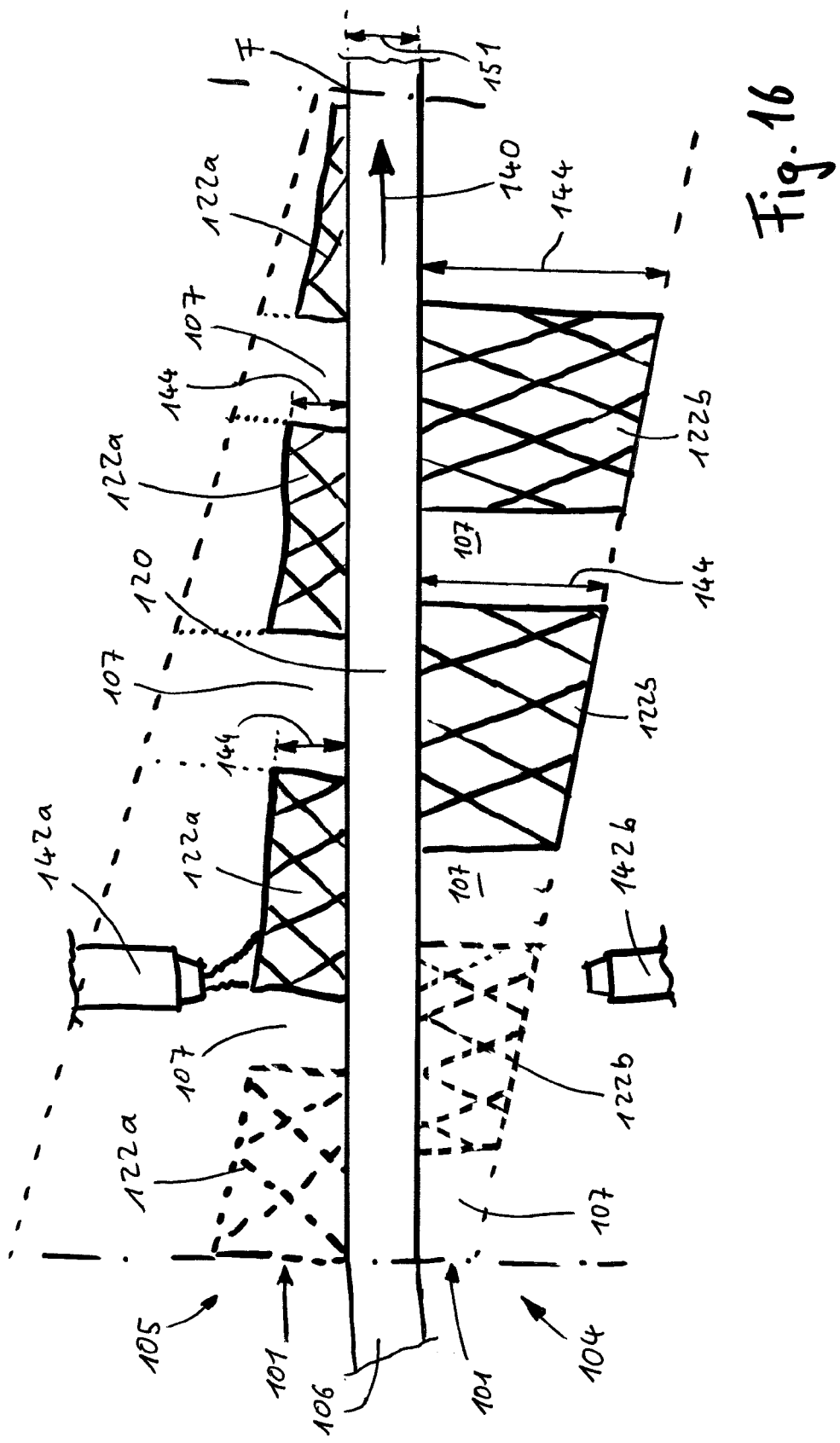
FIG. 16, schematically in section a filter medium, not folded, of a filter similar to the filter of FIGS. 1 to 15, in which at the raw side and at the clean side lines of adhesive are arranged, wherein the height of the lines of adhesive perpendicular to the filter medium alternatingly increases and decreases with their spacing relative to the neighboring fold edges.

In FIG. 16, a medium section 120 of the filter medium 106, which is similar to the filter media 14; 106 of FIGS. 1 to 15, is shown in the unfolded state. The filter medium 106 is moved horizontally in a transport direction 140 between an upper applicator nozzle 142a and a lower applicator nozzle 142b. The raw side 105 of the filter medium is at the top in FIG. 16, the clean side 104 at the bottom. By means of the applicator nozzles 142a and 142b, the adhesive sections 122a are applied to the raw side 105 and the adhesive sections 122b to the clean side 104 of the filter medium 106. On the raw side 105, the height 144 of the adhesive sections 122 perpendicularly to the filter medium 106 increases continuously from the leading fold edge F in the transport direction 140, in FIG. 16 to the right, toward the trailing fold edge F, to the left, within an adhesive section 122a as well as between the adhesive sections 122a that are separated from each other by interruptions 107 of the adhesive. At the raw side 107 the height 144 of the adhesive sections 122b provided thereat decreases correspondingly continuously from the leading fold edge F to the rearward fold edge F.

The raw-side adhesive sections 122a overlap the clean-side adhesive sections 122b so that the raw-side adhesive sections 122a project past the clean-side interruptions 107 of the adhesive and, vice versa, the clean-side adhesive sections 122b project past the raw-side interruptions 107 of the adhesive.

In a medium section not shown in FIG. 16 that follows the medium section 120 in the transport direction 140, the heights 144 of the raw-side adhesive sections 122a decrease from the rearward fold edge F in the transport direction 140 to the next fold edge. Accordingly, on the clean side 104, in the next medium section, the height 144 of the adhesive section 122b increases from the rearward fold edge F to the next fold edge. In analogy, a medium section, that is also not shown in FIG. 16 and that precedes the illustrated medium section 120 in transport direction 140, is constructed with respect to the leading fold edge F mirror-symmetrical to the illustrated medium section 120.

Figure 17:
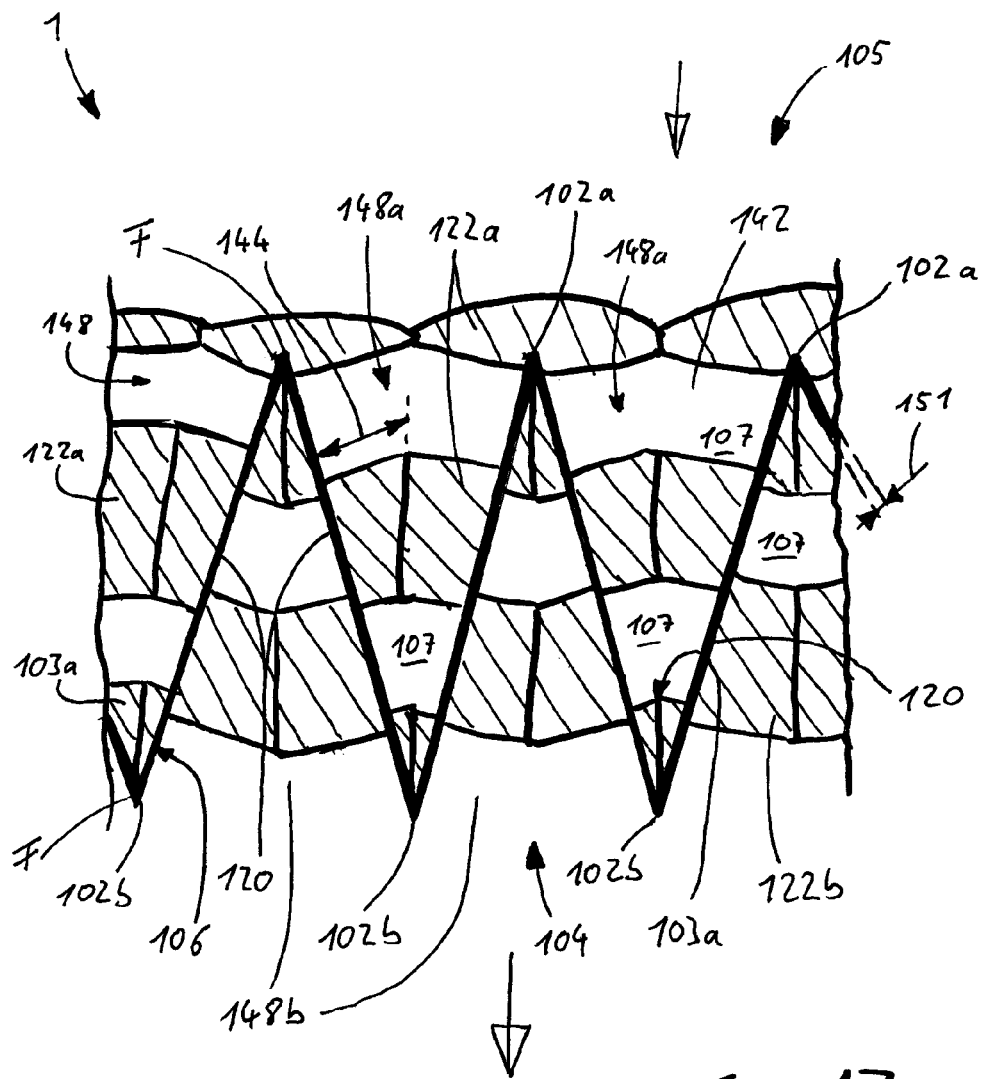
FIG. 17, schematically in section a detail of a filter element with a folded filter medium of a filter similar to the filter of FIGS. 1 to 16, in which the free sides of the adhesive sections of a filter medium section are each resting flat on a corresponding free side of the adhesive sections of the filter medium section that is oppositely positioned in the intermediate fold space.

In FIG. 17, a filter element 1 is illustrated in longitudinal section; it is folded of a filter medium 106 that is similar to the filter element 106 in FIG. 16. In the raw-side intermediate fold spaces 148a, the free sides of the raw-side adhesive sections 122a of a medium section 120 that are facing away from the surface of the filter element 106 are resting on the corresponding free sides of the adhesive sections 122a of the respective oppositely positioned medium section 120.

By means of the adhesive sections 122a resting on each other, neighboring medium sections 120 of an intermediate fold space 148 are supported relative to each other and their shape is maintained. Also, the adhesive sections 122 form boundaries for the passage sections 124 that are shown in FIGS. 3, 4 and 8 to 15.

As on the raw side 105, on the clean side the free sides of the adhesive sections 122b of a clean-side intermediate fold space 144b are resting flat against each other and prevent in this way a collapse of the clean-side intermediate fold spaces 148b.

Figure 18:
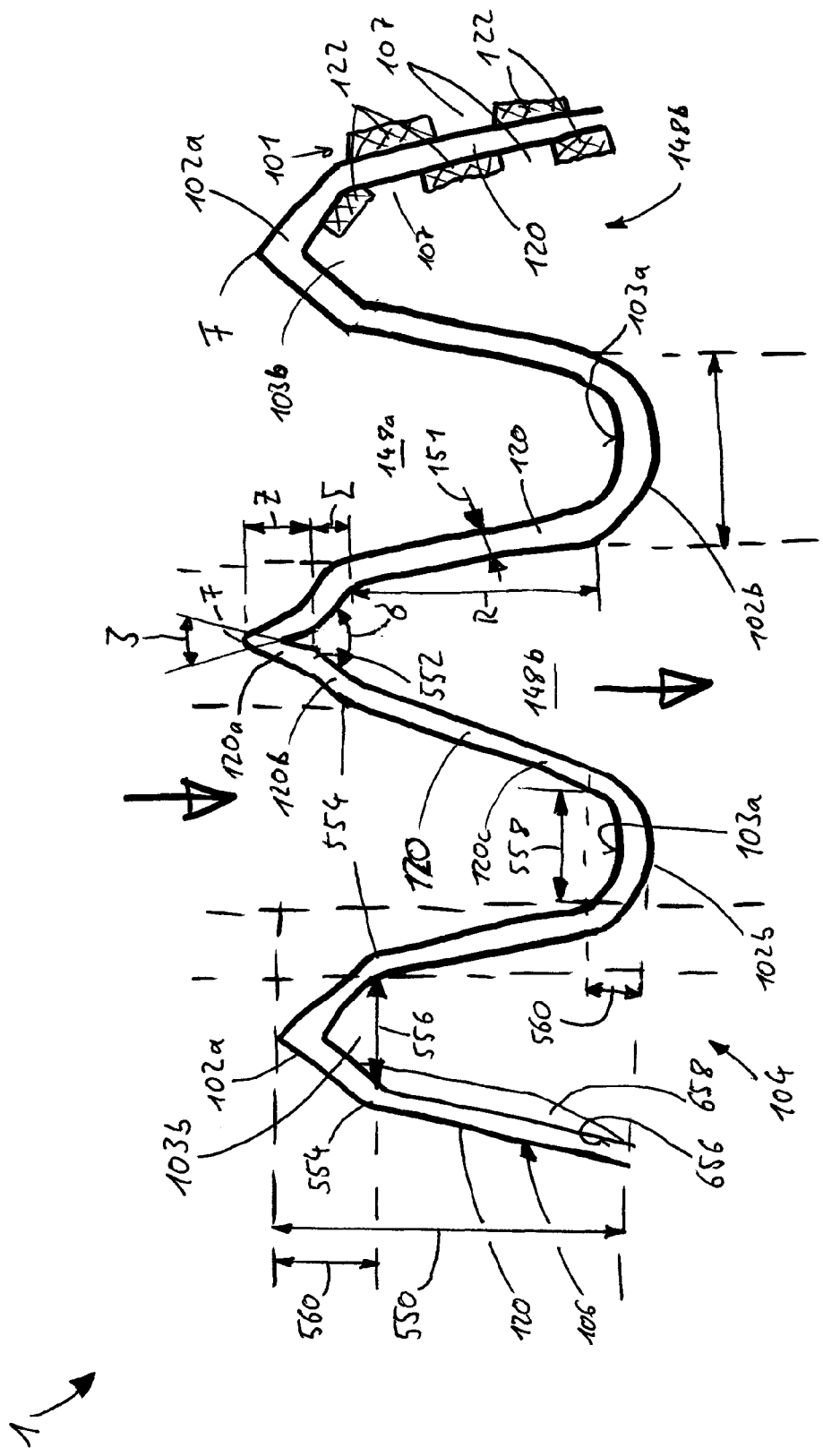
FIG. 18, schematically in section an alternative filter element of a filter similar to the filters of FIGS. 1 through 17 in which the raw-side fold tips are crimped and the raw-side fold bases are widened.

In FIG. 18, a section of a further embodiment of a filter element 1 is shown in which the raw-side fold tips 102a, similar to the embodiment of FIG. 7, have a multi-step shape. The total fold height 550 is approximately 5 cm to 40 cm, in particular 20 cm to 40 cm. The thickness 151 of the filter medium 106 is approximately 0.5 mm.

The filter medium sections 120 that extend on both sides of the raw-side fold tips 102a toward the neighboring raw-side fold bases 103a, each have at the end of a first section 120a a first bend 552 toward the raw side 105 at a spacing Z from the fold edge F. The length Z of the first area 120a is approximately 5 mm. The first areas 120a are positioned at an angle ζ of approximately 5 degrees relative to each other. Instead, they can also be positioned relative to each other at an angle ζ of less than 5 degrees or between 5 degrees and approximately 10 degrees.

At a spacing Σ from the first bend 552 the filter medium sections 120 have a second bend 554 toward the clean side 104. The length Σ of a second area 120b between the first bend 552 and the second bend 554 is approximately 5 mm. The second areas 120b are positioned at an angle δ of approximately 24 degrees relative to each other. They can instead also be positioned at an angle δ between 10 degrees and 24 degrees or between 24 degrees and 40 degrees relative to each other.

The lengths Σ and/or Z can also be less than 5 mm or up to approximately 10 mm.

Adjoining the second area 120b, third areas 120c extend up to the raw-side fold bases 103a, respectively. The third areas 120c are positioned at an angle of approximately 0.2 degrees relative to each other. Instead, they can also be positioned at a different angle, preferably between approximately −5 degrees and approximately +5 degrees relative to each other.

The raw-side fold bases 103a have an approximately V-shaped profile that is tapering in a pointed shape to the raw-side fold edge 102a. In contrast thereto, the clean-side fold bases 103b have an approximately U-shaped profile. Clean-side filter base widths 556 of the clean-side filter bases 103b, at the level of the two second bends 554 at a distance 560 from the appropriate raw-side fold edge 102a, are smaller than raw side filter base widths 558 of the raw side filter bases 103a at the corresponding distance 560 from the clean-side fold edges 102b.

The shape of the raw-side fold tips 102a is produced during manufacture in that the filter medium 106 is first folded along the fold edges F and, subsequently, crimped in the first areas 120a. In doing so, the material of the filter medium 106 is compressed in the first area 120a and, at the same time, the first bends 552 and the second bends 554 are created.

In addition, as illustrated in an exemplary fashion in FIG. 18 on the medium section 120 shown to the far right, similar to the embodiments of FIGS. 1 to 3, 4, and 8 to 17, adhesive sections 122 and interruptions 107 of the adhesive along the corresponding lines of adhesive 101 may be arranged optionally on the medium sections 120 at the raw side 105 and/or the clean side 104.

Moreover, similar to the embodiments described farther down in connection with FIGS. 19 to 25 and as shown in an exemplary fashion in FIG. 18 on the medium section 120 all the way to the left, the medium sections 120 may be provided optionally on the clean side 105 with depressions 656 that, on the raw sides 104, produce correspondingly shaped projections 658.

Figure 21:
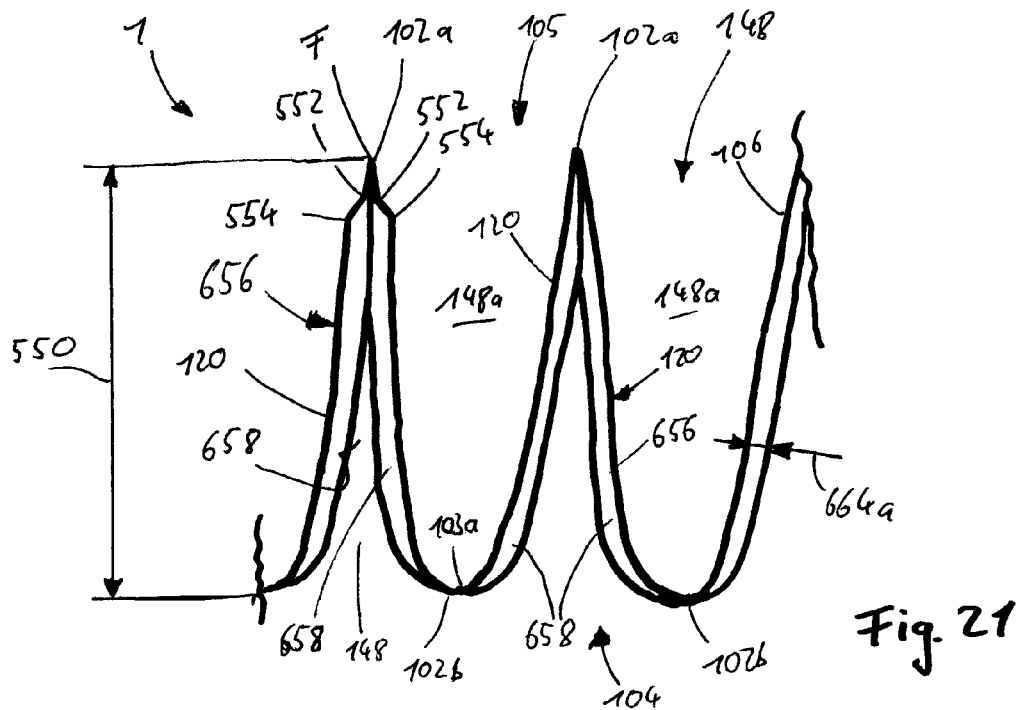
FIG. 21, a section of a further embodiment of a filter element similar to the filter elements of FIGS. 19 and 20 in which the depths of the depressions across the fold height is approximately constant.

In FIG. 19 a section of a filter element 1 according to a further embodiment is illustrated. On the raw side 105 the filter medium 106 is embossed with a plurality of elongate depressions 656. The depressions 656 extend between the raw-side fold tips 102a and the raw-side fold bases 103a perpendicularly to the fold edges F. The depressions 656 each have a depth 664a of approximately 1 mm. A width 666 of the depressions 656 in the direction of the fold edges F is approximately 25 mm to 35 mm. The depth 664 of the depressions 656, as shown in FIG. 21 in cross-section, is substantially constant across the height of the folds. Alternatively, as shown in FIG. 22, the depth 664b of the depressions 656b can decrease from the raw-side fold tips 102a to the raw-side fold bases 103a.

Figure 22:
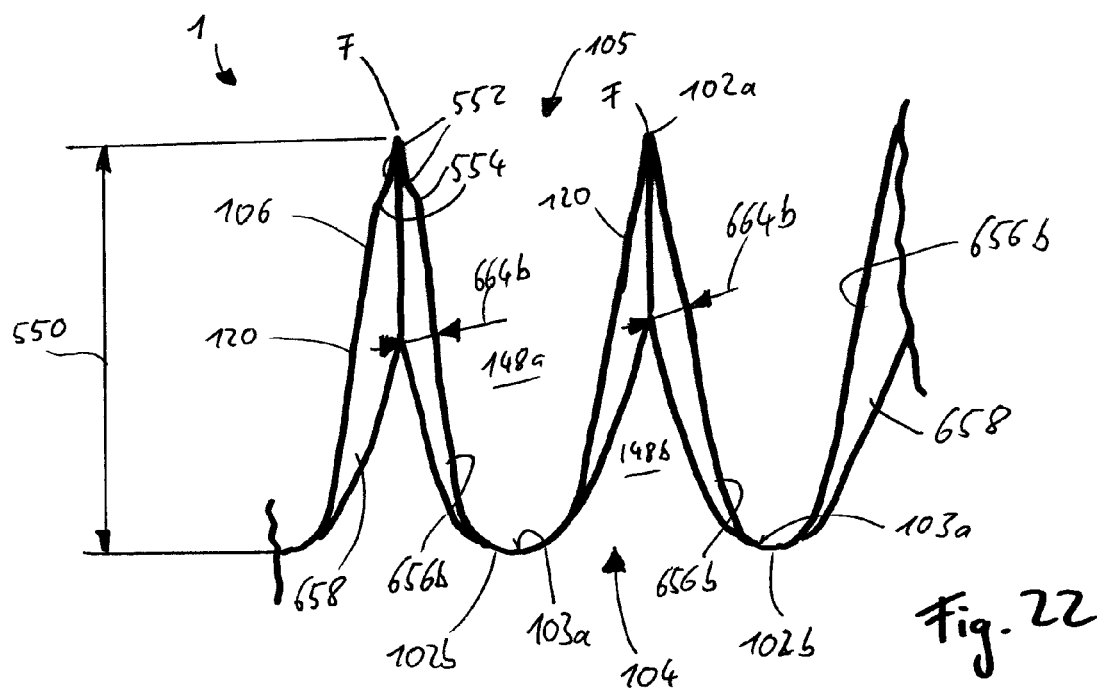
FIG. 22, a section of a filter element similar to the filter element of FIG. 21 in which the depth of the depressions from the raw-side fold tips to the fold bases at the raw side decreases in a wedge shape.

In the left folds illustrated in FIGS. 21 and 22, in an exemplary fashion the raw-side fold tips 102a, similar to the embodiments of FIGS. 7 and 18, are crimped and of a multi-step configuration.

The depressions 656 are realized as grooves that form on the clean side 104 corresponding projections 658. At the raw-side intermediate fold space 148a, the depressions 656 of the two medium sections 120 that delimit the intermediate fold space 148a are positioned directly opposite each other and form each partially a flow passage 660. The flow passages 660 extend perpendicularly to the fold edges F.

In the area of the right depressions 656 in FIG. 19 a support 662 is formed in an exemplary fashion in the medium sections 120. The supports 662 project in the direction toward the clean side 104.

In an exemplary fashion, on the clean side 104 a glue bead 622 is arranged, respectively, instead of the supports 262 in the left flow passage 660 in FIG. 19. The glue beads 622 serve for stabilization of the flow passages 660.

The supports 662 can also be combined with the glue beads 622, for example, in such a way that the glue beads 622 are located on the supports 662.

Between the flow passages 660 on the raw side 105 an adhesive section 122 with interruptions 107 of the adhesive is arranged, respectively. These adhesive sections 122 extend similar to the embodiments of FIGS. 3, 4 and 8 to 18 along the lines of adhesive 101.

Figure 20:
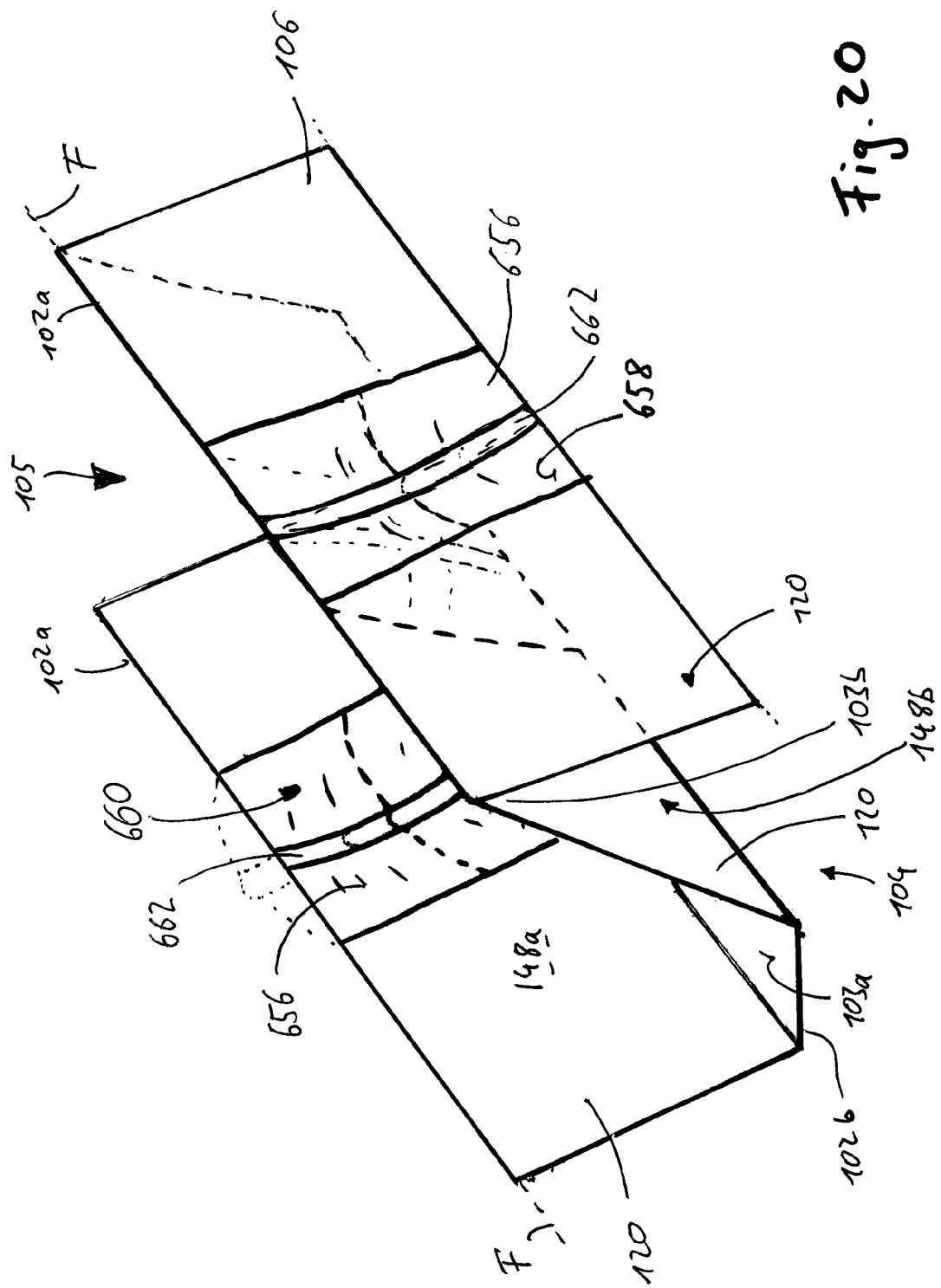
FIG. 20, an isometric detail view of a further embodiment of a filter element similar to the filter element of FIG. 19 in which the raw-side fold bases in comparison to the raw-side fold tips are widened.

In FIG. 20, a further embodiment of a filter element 1 is illustrated which is similar to the filter element 1 of FIG. 19. In contrast to the filter element 1 of FIG. 19, the raw-side fold bases 103a in the embodiment of FIG. 20 are widened in comparison to the clean-side fold bases 103b. As a whole, the intermediate fold spaces 148a and 148b thus have a similar effect as the intermediate fold spaces 148a and 148b of the filter element 1 of FIG. 18.

Figure 23:
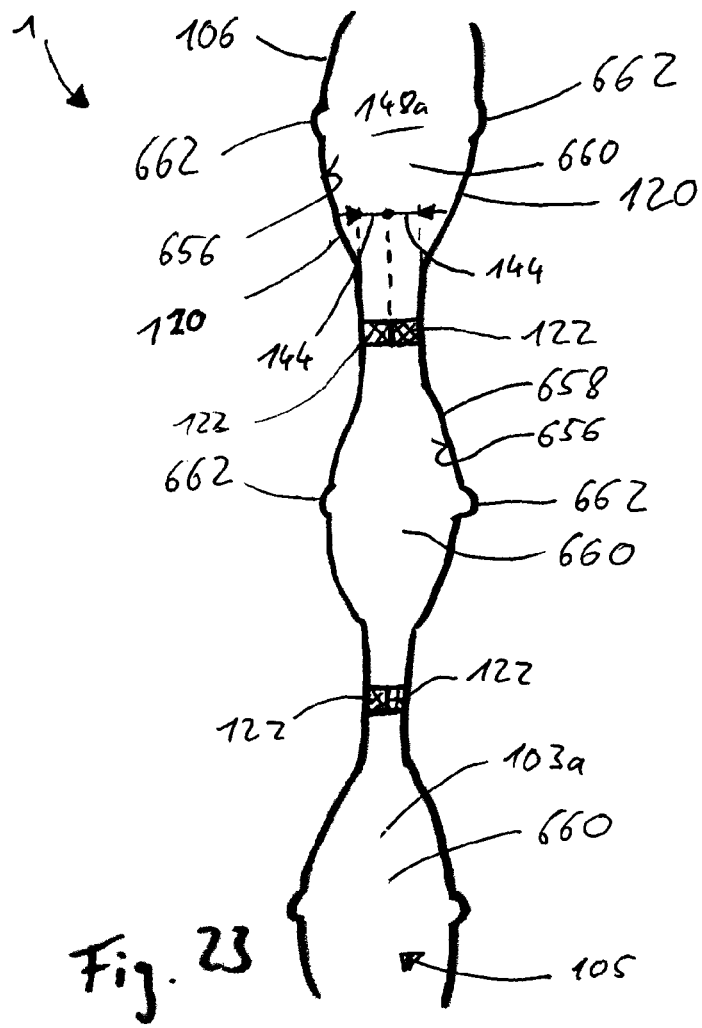
FIG. 23, a section of a filter element similar to that of the filter elements of FIGS. 19 to 22, along a section plane parallel to a plane through the raw-side fold tips in which, between neighboring depressions, a line of adhesive is arranged, respectively.

In FIG. 23 a section of the filter element 1 of FIG. 19 parallel to a plane through the raw-side fold tips 102a is shown. In the area of one of the raw-side intermediate fold spaces 148a, the adhesive sections 122 of the oppositely positioned medium sections 120 are resting flat against each other, similar to the embodiment of FIG. 17, and delimit in this way the flow passages 660.

Figure 24:
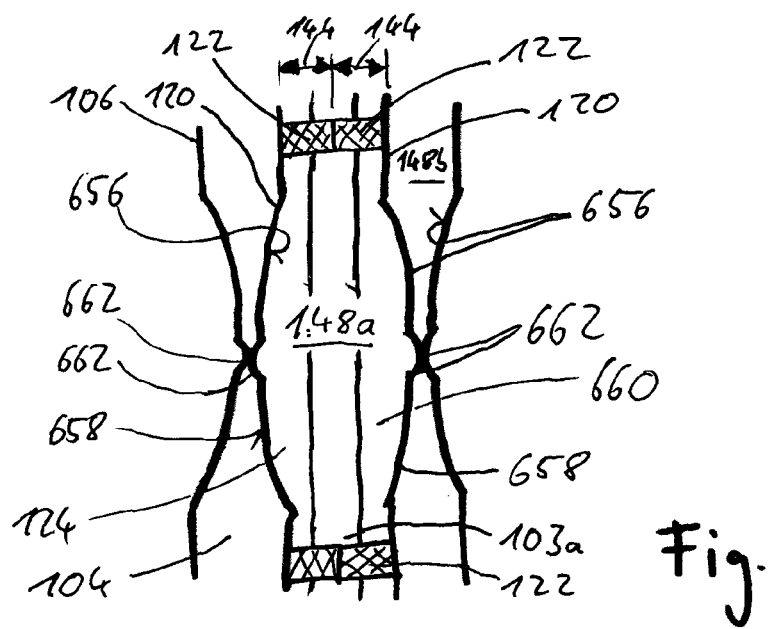
FIG. 24, a section of a filter element which is similar to the filter elements of FIGS. 19 to 22, along a section plane parallel to a plane through the raw-side fold tips in which oppositely positioned supports that are formed on the medium sections that are positioned opposite each other in the clean-side intermediate fold spaces support each other.

In FIG. 24, a filter element 1 that is similar to the filter element 1 of FIG. 20 is shown also in a section parallel to a plane through the raw-side fold tips 102a. In the clean-side intermediate fold spaces 148b, the supports 662 of the medium sections 120 are resting against each other and stabilize in this way the folds and the filter element 1. In contrast to the embodiment of FIG. 20, in the embodiment of FIG. 24, as in the embodiment of FIG. 19, in the raw-side intermediates fold spaces 148*a* on both sides of the flow passages 660 adhesive sections 122 with interruptions 107 of the adhesive are provided. The heights 144 of the adhesive sections 122 perpendicular to the respective raw-side surfaces of the filter medium 106 vary in the embodiments of FIGS. 23 and 24 in analogy to the embodiments of FIGS. 16 and 17 so that the adhesive sections 122 are resting flat against each other and support each other.

Figure 25:
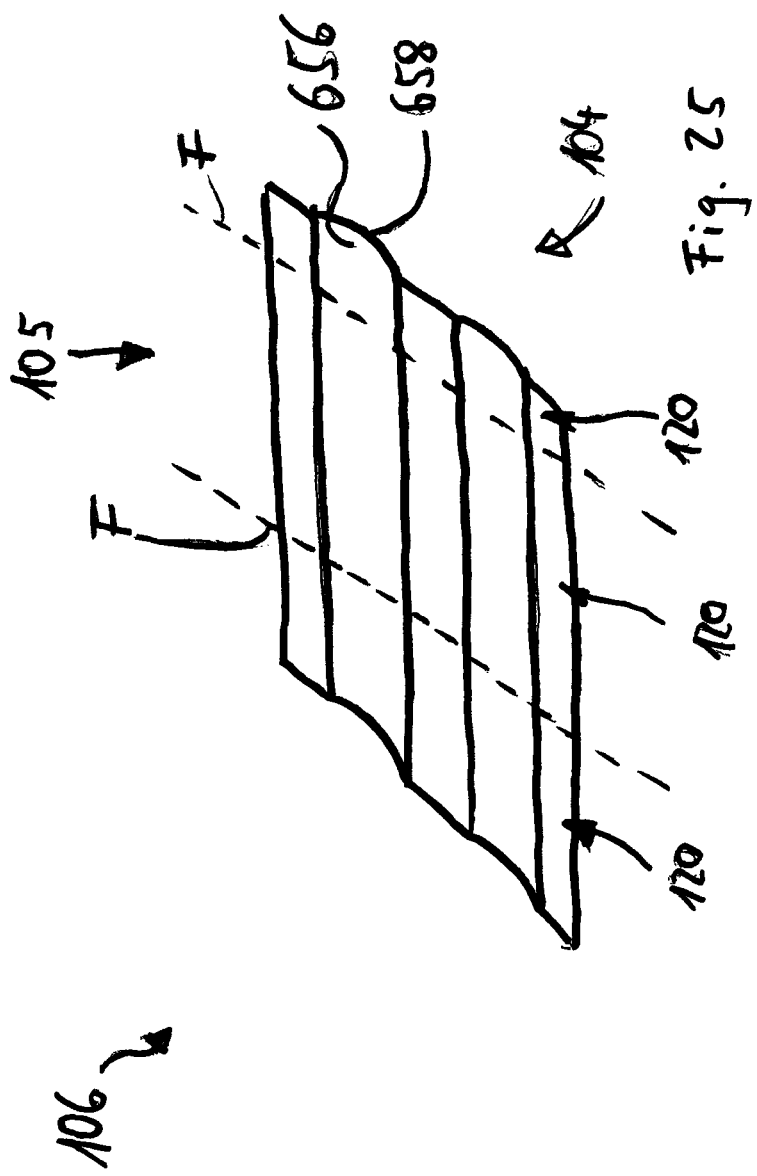
FIG. 25, an isometric illustration of a filter medium, not folded, for use in a filter element similar to the filter elements of FIGS. 19 to 24 in which the depressions are realized by means of grooves that extend perpendicularly to the fold edges.

In FIG. 25, an unfolded filter medium 106 is shown that is provided with grooves for realizing the depressions 656 and the projections 658 in accordance with the embodiments of FIGS. 19 to 24. The grooves extend perpendicularly to the fold edges F. The projections 658 and depressions 656 can be realized also by grooves that are interrupted at the fold edges F.

In all of the above described embodiments of a filter element 1 and of a method for producing a filter element 1, the following modifications are possible inter alia.

The arrangements of the adhesive sections 122 and of the interruptions 107 of the adhesive along the lines of adhesive 101, as described in FIGS. 3, 4 and 8 to 16, the configurations of the raw-side fold tips 102, as described in FIGS. 7 and 18, and the arrangements of depressions 656 and projections 658 on the filter medium 106, as described in FIGS. 19 to 25, can be combined with each other in a meaningful way in a filter element 1.

The straight lines of adhesive 101, instead of being perpendicular, can also be positioned at a slant, or sectionwise at a slant, relative to the fold edges F.

The adhesive sections 122 and the interruptions 107 of the adhesive, instead of extending along the straight lines of adhesive 101 can also extend along lines of adhesive that extend differently, for example, along convoluted or meandering lines of adhesive.

Instead of being V-shaped, W-shaped, or zigzag-shaped, the passages 126 can be extending also in a different way, at least sectionwise, non-parallel to the fold edges F.

In the embodiments illustrated in FIGS. 16 and 17, also every second medium section can be free of adhesive sections. In this case, the height 144 of the adhesive sections 122 on the other medium sections 120 can extend across the entire intermediate fold space. The free sides of the adhesive sections 192 are then resting flat on the respective oppositely positioned surface of the local medium section 120 not provided with adhesive sections.

The FIGS. 26-34 show in exemplary fashion some embodiments of filter media which, in addition to further filter media, can be used for a filter according to the invention.

Figure 26:
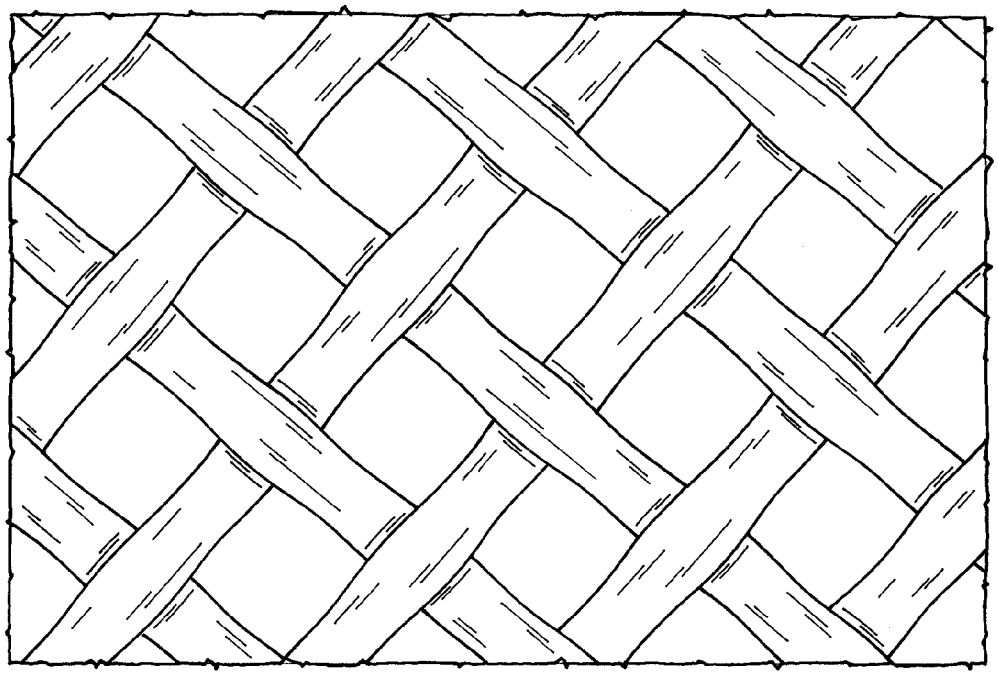
FIG. 26, an uncoated PA 6.6 grid with a mesh width of 100±10 μm.
Figure 27:
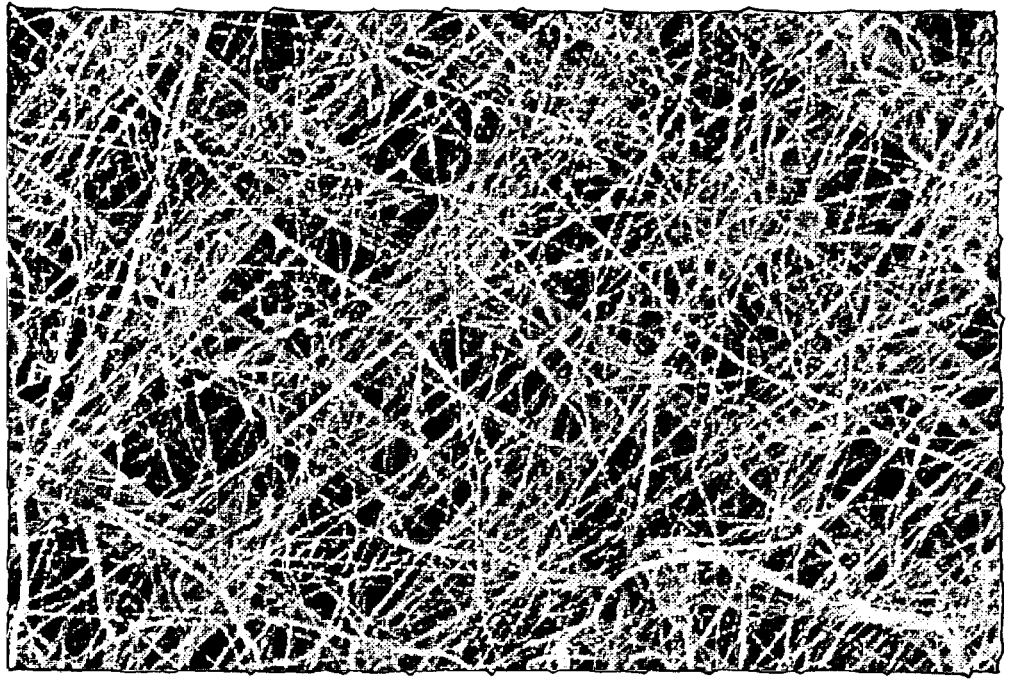
FIG. 27, the grid of FIG. 26 with a coating of nanofibers.
Figure 28:
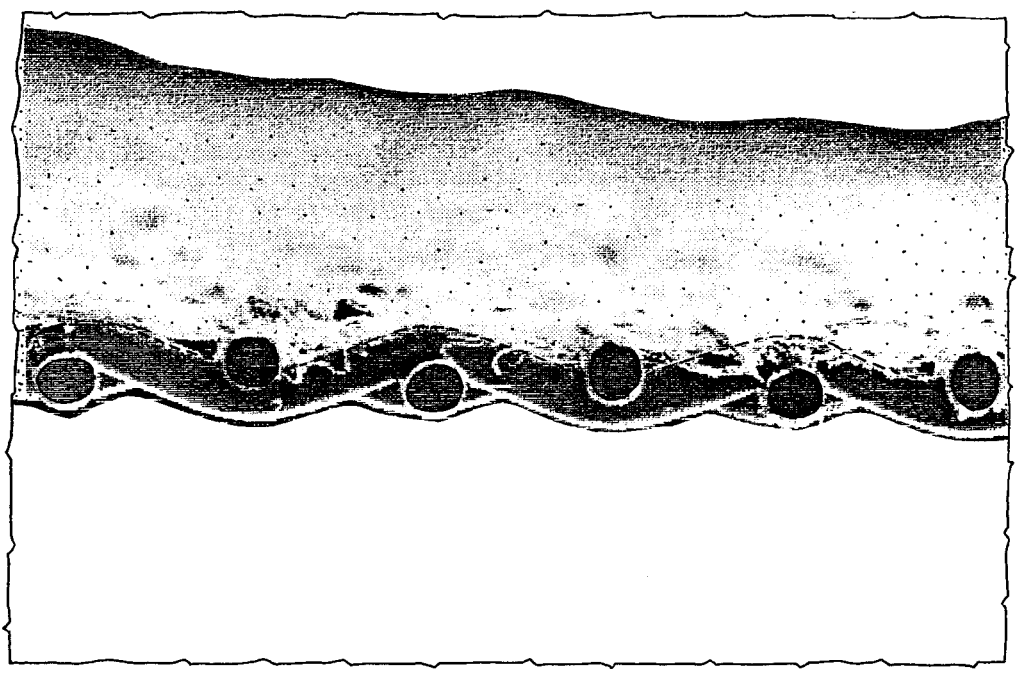
FIG. 28, the coated grid of FIG. 27 in cross-section.
Figure 29:
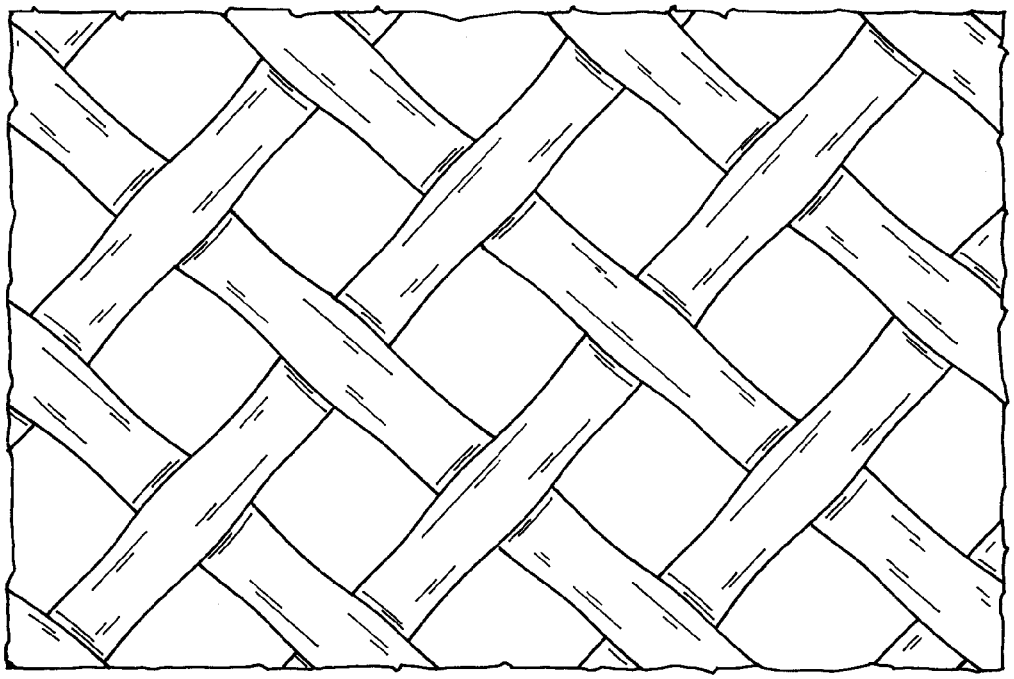
FIG. 29, an uncoated PA 6.6 grid with a mesh width of 102±6 μm.
Figure 30:
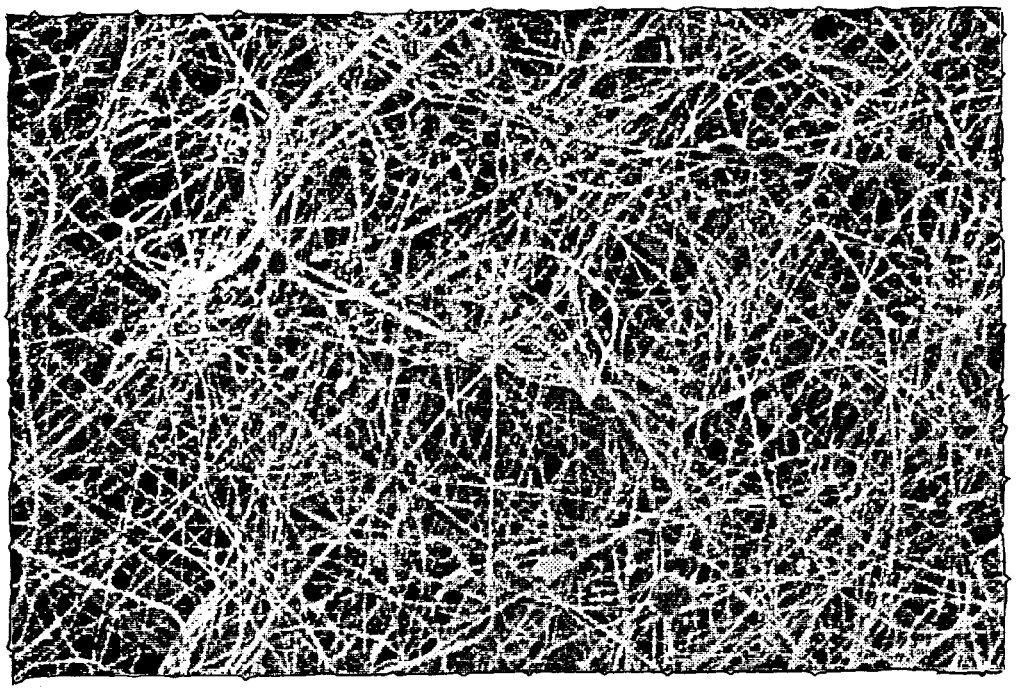
FIG. 30, the grid of FIG. 29 with a coating of nanofibers.
Figure 31:
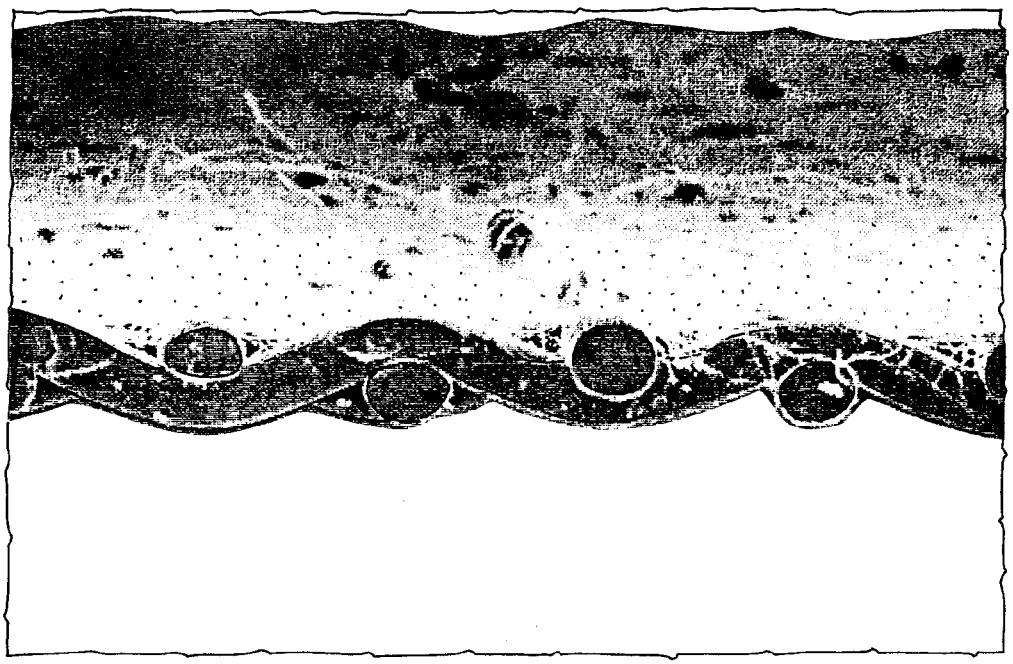
FIG. 31, the coated grid of FIG. 30 in cross-section.
Figure 32:
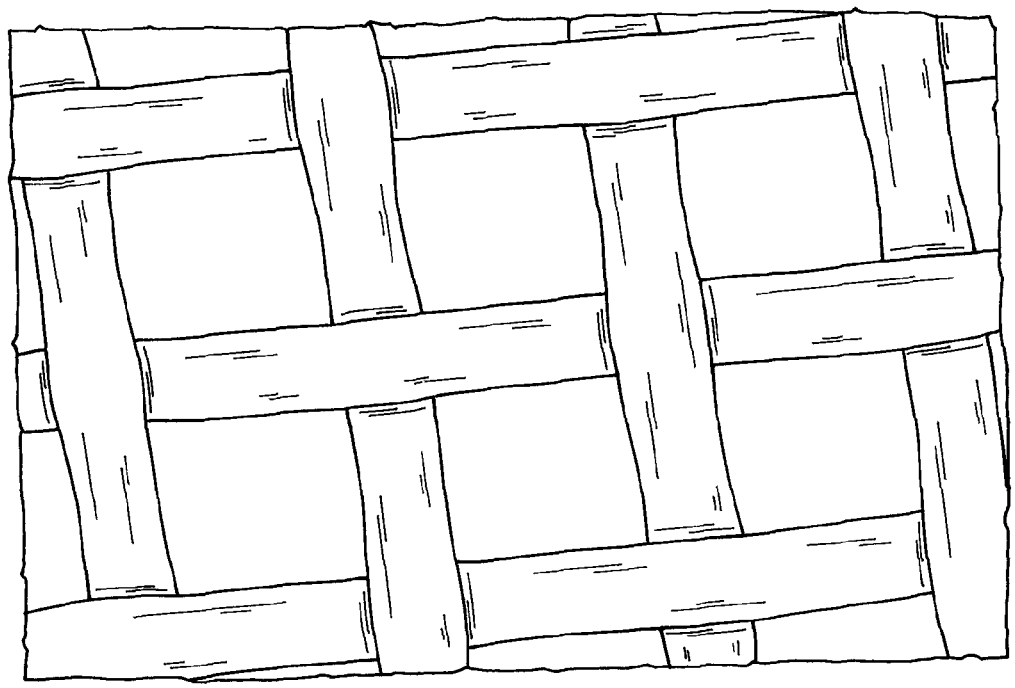
FIG. 32, an uncoated PA 6.6 grid with a mesh width of 150±9 μm.
Figure 33:
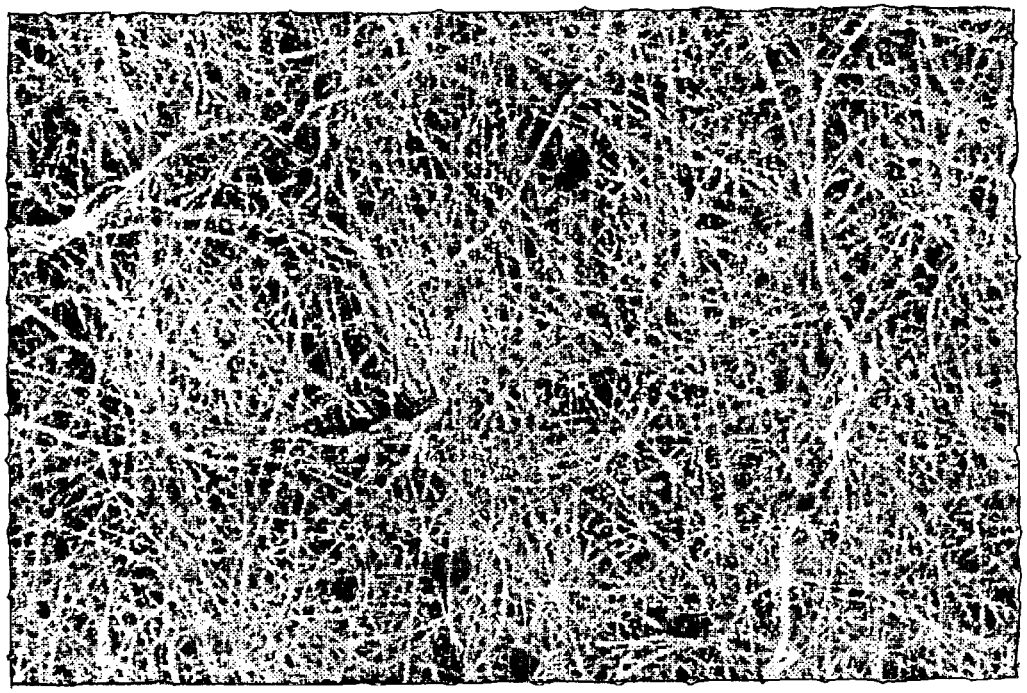
FIG. 33, the grid of FIG. 32 with a coating of nanofibers.
Figure 34:
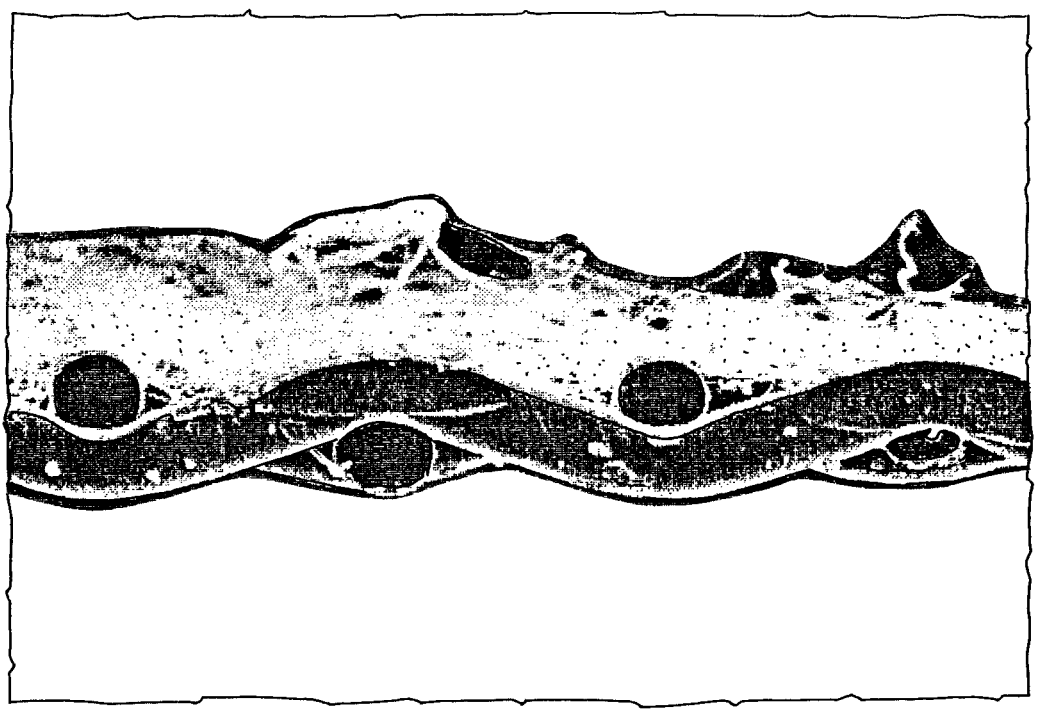
FIG. 34, the coated grid of FIG. 33 in cross-section.

FIG. 26 shows an uncoated PA 6.6 grid with a mesh width of 100±10 μm, FIG. 27 such a grid with a coating of nanofibers. FIG. 28 shows the coated grid in cross-section. The air permeability of the uncoated grid is ~10,000 l/(m²s), that of the coated grid ~800-1,500 l/(m²s). The thread count is 69.9 n/cm, the thickness 70 μm and the weight per surface area 24 g/cm². In FIG. 29, a PP 6.6 grid is illustrated that has a mesh width of 102±6 μm. FIG. 30 shows the coated grid and FIG. 31 a cross-sectional view of the coated grid. The air permeability of the uncoated grid is ~8,600 l/(m²s), that of the coated grid ~1.500 l/(m²s). The thread count is 65 n/cm, the thickness 80 μm, and the weight per surface area is 35 g/cm². A further PA 6.6 grid is illustrated in FIGS. 32 to 34. The mesh width here is 150±9 μm. The air permeability of the uncoated grid is ~11,000 l/(m²s), that of the coated grid ~650-840 l/(m²s). The thread count is 47 n/cm, the thickness is 95 μm and the weight per surface area is 35 g/cm². FIG. 32 shows the uncoated grid, FIG. 33 the coated grid, and FIG. 34 the coated grid in cross-section.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter for filtering a liquid or gaseous fluid comprising:
a filter element (1) with a zigzag-folded filter medium (14; 106) including
a raw side (105); and
a clean side (104);
a plurality of filter medium sections (120) joined to neighboring filter medium sections (120) along fold tips (102*a*) or fold bases (103*a*),
said plurality of filter medium sections (120) extending on both said raw and clean sides from raw-side fold tips (102*a*) to neighboring raw-side fold bases (103*a*), viewed from said raw-side fold tips (102*a*), respectively;
wherein at said raw side (105) a plurality of elongated depressions (656) are formed in said filter medium (14; 106), the depressions having a length in an elongation direction and a width in a direction perpendicular to the elongation direction, the depression length extends between raw-side fold tips (102*a*) and raw-side fold bases (103*a*) approximately perpendicularly to fold edges (F) of said filter medium (14; 106) and realize at said clean side (104) corresponding projections (658) in such a way that in a raw-side intermediate fold space (148*a*) two depressions (656), respectively, are positioned directly opposite each other on said two medium sections (120) delimiting an intermediate fold space (148*a*) and each form partially a flow passage (660);
wherein at a center of a width of at least one of said depressions (656) a support (662) is formed as a further depression into said at least one of said depressions of said filter media, said support which extends in the elongation direction on the center of the depression (656), the corresponding projection (658) and at the raw side (105) forms a recess and at the clean side (104) a raised portion;
wherein at the clean side the raised portion of the support (662) projects outwardly away from the projection (658) in the direction of the clean side (104), the support having a width less than the width of the projection (658);
wherein the support (662) on a first one of said filter medium sections (120) rests directly against and lies directly upon a corresponding support (662) on an adjacent one of said filter medium sections (120).

2. The filter according to claim 1, wherein
at said clean side (104) at a center of at least one of said projections (658) an adhesive section (622) is arranged that extends along the projection (658).

3. The filter according to claim 1, wherein
in a clean-side intermediate fold space (148b) two projections (658) as supports (662) or adhesive sections (622), on the two medium sections (120) that delimit the intermediate fold space (148b) support each other.

4. The filter according to claim 1, wherein
depths (664a) of said depressions (656) across a height (550) of the folds is substantially constant.

5. The filter according to claim 1, wherein
depths (664b) of said depressions (656) decreases from the fold edges (F) to the fold bases (103a).

6. The filter according to claim 1, wherein
between two neighboring flow passages (660) at least one adhesive section (122) is arranged on said raw side (105) of said filter medium (106), respectively, so as to extend approximately perpendicularly to the direction of said fold edges (F).

7. The filter according to claim 6, wherein
a height (144) of the at least one adhesive section (122) perpendicular to said filter medium (14; 106) varies so that said adhesive section (122) in said folded filter medium (14; 106) with its free side that is facing away from said filter medium (14; 106) rests flat on a corresponding free side of an adhesive section (122) that is positioned oppositely in said intermediate fold space (148a) or on a surface of the oppositely positioned medium section (120).

8. The filter according to claim 1, wherein
said depressions (656) and said projections (658) are realized in the form of grooves in the unfolded filter medium (106) that extend perpendicularly to said fold edges (F).

9. The filter according to claim 1, wherein
said filter medium sections (120) that extend on both sides from the raw-side fold tips (102a) to the neighboring raw-side fold bases (103a), viewed from the raw-side fold tips (102a), respectively, have a first bend (552) toward said raw side (105) and therebehind a second bend (554) toward said clean side (104).

\* \* \* \* \*